United States Patent
Antoniades et al.

[11] Patent Number: 6,167,156
[45] Date of Patent: *Dec. 26, 2000

[54] COMPRESSION OF HYPERDATA WITH ORASIS MULTISEGMENT PATTERN SETS (CHOMPS)

[75] Inventors: John A. Antoniades, Fulton; Mark M. Baumback, University Park, both of Md.; Jeffrey H. Bowles, Alexandria; John M. Grossman, Falls Church, both of Va.; Daniel G. Haas, Lothian, Md.; Peter J. Palmadesso, Manassas, Va.

[73] Assignee: The United States of America as represented by the Secretary of the Navy, Washington, D.C.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/035,909

[22] Filed: Mar. 6, 1998

Related U.S. Application Data

[63] Continuation-in-part of application No. 08/679,085, Jul. 12, 1996.

[51] Int. Cl.$^7$ ............................... G06K 9/36; G06K 9/46
[52] U.S. Cl. ........................... 382/232; 382/100; 382/155
[58] Field of Search ..................................... 382/232, 155, 382/251, 253, 254, 100, 234, 244, 276, 302–304

[56] References Cited

U.S. PATENT DOCUMENTS

| | | | |
|---|---|---|---|
| 5,491,487 | 2/1996 | Gerlach | 342/378 |
| 5,832,131 | 11/1998 | Choo et al. | 382/253 |
| 6,038,344 | 3/2000 | Palmadesso et al. | 382/191 |

OTHER PUBLICATIONS

Smith et al, "A New Approach to Quantifying Abundances of Materials . . . " Feb. 1994 pp. 2372–2374.
Kneubuehler et al, "Comparison of Different Approaches of Selecting Endmembers . . . " pp. 888–890, Jan. 1998.
Asner et al, "Unmixing the Directional Reflections of AVHRR . . . " pp. 868–878, Jul. 1997.

*Primary Examiner*—Bhavesh Mehta
*Attorney, Agent, or Firm*—John J. Karasek; Charles J. Stockstill

[57] ABSTRACT

The Compression of Hyperdata with ORASIS Multisegment Pattern Sets, (CHOMPS), system is a collection of algorithms designed to optimize the efficiency of multi spectral data processing systems. The CHOMPS system employs two types of algorithms, Focus searching algorithms and Compression Packaging algorithms. The Focus algorithms employed by CHOMPS reduce the computational burden of the prescreening process by reducing the number of comparisons necessary to determine whether or not data is redundant, by selecting only those exemplars which are likely to result in the exclusion of the incoming sensor data for the prescreener comparisons. The Compression Packaging algorithms employed by CHOMPS, compress the volume of the data necessary to describe what the sensor samples. In the preferred embodiment these algorithms employ the Prescreener, the Demixer Pipeline and the Adaptive Learning Module Pipeline to construct a compressed data set. The compression is realized by constructing the data set from the exemplars defined in the prescreening operation and expressing those exemplars in wavespace with the necessary scene mapping data, or further processing the exemplars through the adaptive learning pipeline and expressing the exemplars in terms of endmembers, to facilitate the efficient storage, download and the later reconstruction of the complete data set with minimal deterioration of signal information.

13 Claims, 14 Drawing Sheets

$S_1 \perp = V_{30}$ $T_{S1S2S3} = T_{E1E2E3} @ t=0$

COMPRESSION OF HYPERDATA WITH ORASIS MULTISEGMENT PATTERN SETS (CHOMPS)

This is a continuation in part of application Ser. No. 08/679,085, attorney docket number 77,409, filed Jul. 12, 1996, and which is currently pending.

BACKGROUND OF THE INVENTION

The present invention relates generally to processing signals, and more particularly to a system for the rapid compression of hypersensor data sets that contain objects, substances, or patterns embedded in complex backgrounds. A hypersensor is a sensor which produces as its output a high dimensional vector or matrix consisting of many separate elements, each of which is a measurement of a different attribute of the system or scene under construction. A hyperspectral imager is an example of a hypersensor. Hypersensors based on acoustic or other types of signals, or combinations of different types of input signals are also possible.

Historically there have been three types of approaches to the problems relating to the detection of small, weak or hidden objects, substances or patterns embedded in complex backgrounds.

The first approach has been to use low dimensional sensor systems which attempt to detect a clean signature of a well known target in some small, carefully chosen subset of all possible attributes, e.g., one or a few spectral bands. These systems generally have difficulty when the target signature is heavily mixed in with other signals, so they typically can detect subpixel targets or minority chemical constituents of a mixture only under ideal conditions, if at all. The target generally must fill at least one pixel, or be dominant in some other sense as in some hyperspectral bands. Also, the optimal choice of bands may vary with the observing conditions or background (e.g. weather and lighting), so such systems work best in stable, predictable environments. These systems are simpler than the high dimensional sensors (hypersensors), but they also tend to be less sensitive to subdominant targets and less adaptable.

The second approach has been to employ high dimensional sensor systems which seek to detect well known (prespecified) targets in complex backgrounds by using Principle Components Analysis (PCA) or similar linear methods to construct a representation of the background. Orthogonal projection methods are then used to separate the target from the background. This approach has several disadvantages. The methods used to characterize the background are typically not 'real time algorithms'; they are relatively slow, and must operate on the entire data set at once, and hence are better suited to post-processing than real time operation. The background characterization can get confused if the target is present in a statistically significant measure when the background is being studied, causing the process to fail. Also, the appearance of the target signature may vary with the environmental conditions: this must be accounted for in advance, and it is generally very difficult to do. Finally, these PCA methods are not well suited for detecting and describing unanticipated targets, (objects or substances which have not been prespecified in detail, but which may be important) because the representation of the background constructed by these methods mix the properties of the actual scene constituents in an unphysical and unpredictable way. PCA methods are also used for compression schemes however they have many of the same shortcomings. Learned Vector Quantization (LVQ) is also used for compression. Current LVQ schemes use minimum noise fraction (MNF) or average patterns of PCs to compress the data, or various iterative methods which are slow and require a priori knowledge of sensor characteristics.

The more recent approach is based on conventional convex set methods, which attempt to address the 'endmember' problem. The endmembers are a set of basis signatures from which every observed spectra in the dataset can be composed in the form of a convex combination, i.e., a weighted sum with non-negative coefficients. The non-negativity condition insures that the sum can sensibly be interpreted as a mixture of spectra, which cannot contain negative fractions of any ingredient. Thus every data vector is, to within some error tolerance, a mixture of endmembers. If the endmembers are properly constructed, they represent approximations to the signature patterns of the actual constituents of the scene being observed. Orthogonal projection techniques are used to demix each data vector into its constituent endmembers. These techniques are conceptually the most powerful of the previous approaches, but prior methods for implementing the convex set ideas are slow, (not real time methods) and cannot handle high dimensional pattern spaces. This last problem is a serious limitation, and renders these methods unsuitable for detecting weak targets, since every constituent of a scene which is more dominant than the target must be accounted for in the endmember set, making weak target problems high dimensional. In addition, current convex set methods give priority to the constituents of the scene which are dominant in terms of frequency of occurrence, with a tendency to ignore signature patterns which are clearly above the noise but infrequent in the data set. This makes them unsuitable for detecting strong but small targets unless the target patterns are fully prespecified in advance.

When operating in high dimensional pattern spaces massive quantities of data must be managed which requires hundreds of millions of computations for each pixel. Thus the need to compress massive quantities of data for storage, download, and/or real time analysis becomes increasingly important and equally elusive.

SUMMARY OF THE INVENTION

Accordingly, it is an object of this invention to compress multispectral data, while preserving the spectral information for the detection of objects or substances embedded in complex backgrounds.

Another object of this invention is accurate and quickly compress multidimensional data sets from chemical, acoustic or other types of hypersensors capable of handling multidimensional analysis.

Another object of this invention is to process signals and compress data with a fast set of algorithms which provide a greatly reduced computational burden in comparison to existing methods.

Another object of this invention is to compress hyperspectral or multispectral data in a system employing parallel processing which offers true real time operation in a dynamic scenario.

These and additional objects of this invention are accomplished by the structures and processes hereinafter described.

The Compression of Hyperdata with ORASIS Multisegment Pattern Sets, (CHOMPS), system is a collection of algorithms designed to optimize the efficiency of multi spectral data processing systems. The CHOMPS system employs two types of algorithms, Focus searching algorithms and Compression Packaging algorithms. In a preferred embodiment CHOMPS system is integrated into the Intelligent Hypersensor Processing System (IHPS). IHPS is a system for processing high dimensional data employing a prescreener module to reduce the size of the data set received from the sensor and employing Grahm Schmidt/Salient methods to reduce the dimensional space necessary to describe what the hypersensor detects with a minimal loss of useful information. The IHPS prescreener reduces the size of the data set by comparing the incoming data from the sensor with previously sampled data, called exemplars, and excludes the incoming sensor data the prescreener characterizes as redundant.

The Focus algorithms employed by CHOMPS reduce the computational burden of the prescreening process by reducing the number of comparisons necessary to determine whether or not data is redundant, by selecting only those exemplars which are likely to result in the exclusion of the incoming sensor data for the prescreener comparisons. The CHOMPS system also employs Compression Packaging algorithms, which compress the volume of the data necessary to describe what the sensor samples. In the preferred embodiment these algorithms employ the Prescreener, the Demixer Pipeline and the Adaptive Learning Module Pipeline to construct a compressed data set. The compression is realized by constructing the data set from the exemplars defined in the prescreening operation and expressing those exemplars in wavespace with the necessary scene mapping data, or further processing the exemplars through the adaptive learning pipeline and expressing the exemplars in terms of endmembers, to facilitate the efficient storage, download and the later reconstruction of the complete data set with minimal deterioration of signal information.

DETAILED DESCRIPTION OF THE PREFERRED EMBODIMENTS

The Compression of Hyperdata with ORASIS Multisegment Pattern Sets, (CHOMPS), system is a collection of algorithms designed to optimize the efficiency of multi spectral data processing systems. The CHOMPS system employs two types of algorithms, Focus searching algorithms and Compression Packaging algorithms. In a preferred embodiment CHOMPS system is integrated into the Intelligent Hypersensor Processing System (IHPS). IHPS is a system for processing high dimensional data employing a prescreener module to reduce the size of the data set received from the sensor and employing Grahm Schmidt/Salient methods to reduce the dimensional space necessary to describe what the hypersensor detects with a minimal loss of useful information.

In the preferred embodiment CHOMPS is integrated into IHPS employed on an aircraft or spacecraft. As the craft flies over or in close proximity to an area of interest, a hypersensor scans the scene or area of interest by taking successive snapshots of the scene below. Each snapshot constitutes a frame of spectral data. The spectral data is scanned frame by frame and displayed as variations in intensity. In the optical example, a frame is the diffracted image on a two dimensional focal plane of a narrow slit which accepts light from a narrow linear strip of the scene. Variations of the sensor layout are possible.

Figure 1:
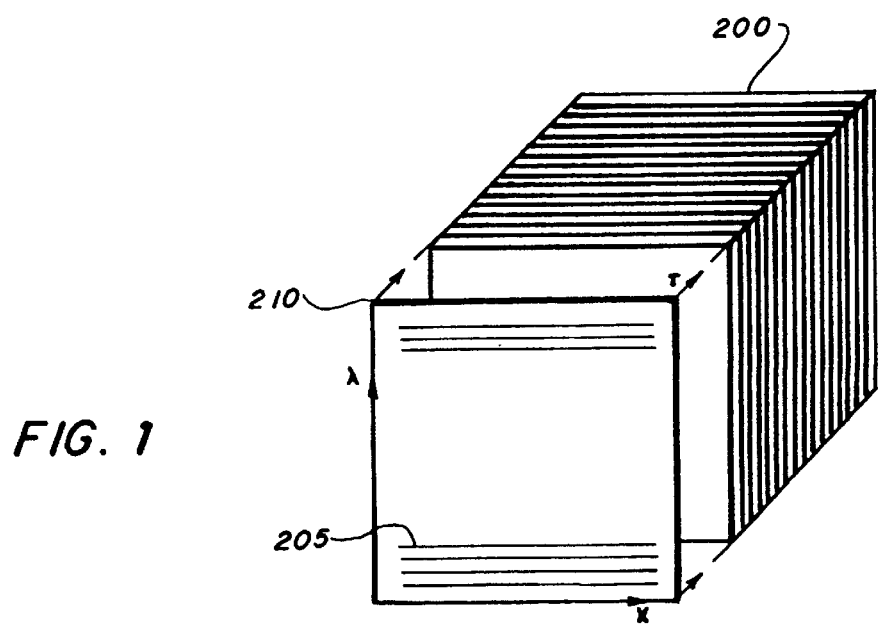
FIG. 1. is a representation of the data cube and the orientation of the spatial and wavelength information in X, λ and T coordinates.

FIG. 1 is a representation of the data cube and the orientation of the spatial and wavelength information. IHPS forms a series of pattern vectors through the concatenation of the outputs of multiple sensors. Each sensor measures a different attribute of the system being observed, and has a consistent relationship to all the other sensors.

Each frame 210 comprises multiple lines 205; each line 205 being the spectral characteristic for a specific point in the scene which correlates to a specific coordinate of the area scanned. Each frame 210 is configured such that the spatial information is expressed along the X axis and wavelength information is contained in the λ direction. Data cube 200, as illustrated in FIG. 1, is created by the concatenation of successive frames 210 (different spatial strips) and represents the observed spectral data of the scene provided by the hypersensor. The observed spectral data, which is used to create data cube 200 is expressed in vector form, and processed one spatial pixel, i.e. one spectrum, at a time. Each pixel is fed into a preprocessor (not shown) which performs normalization and purges bad spectral data, bad spectral data being data corrupted or otherwise useless due to incomplete spectral information.

Figure 2:
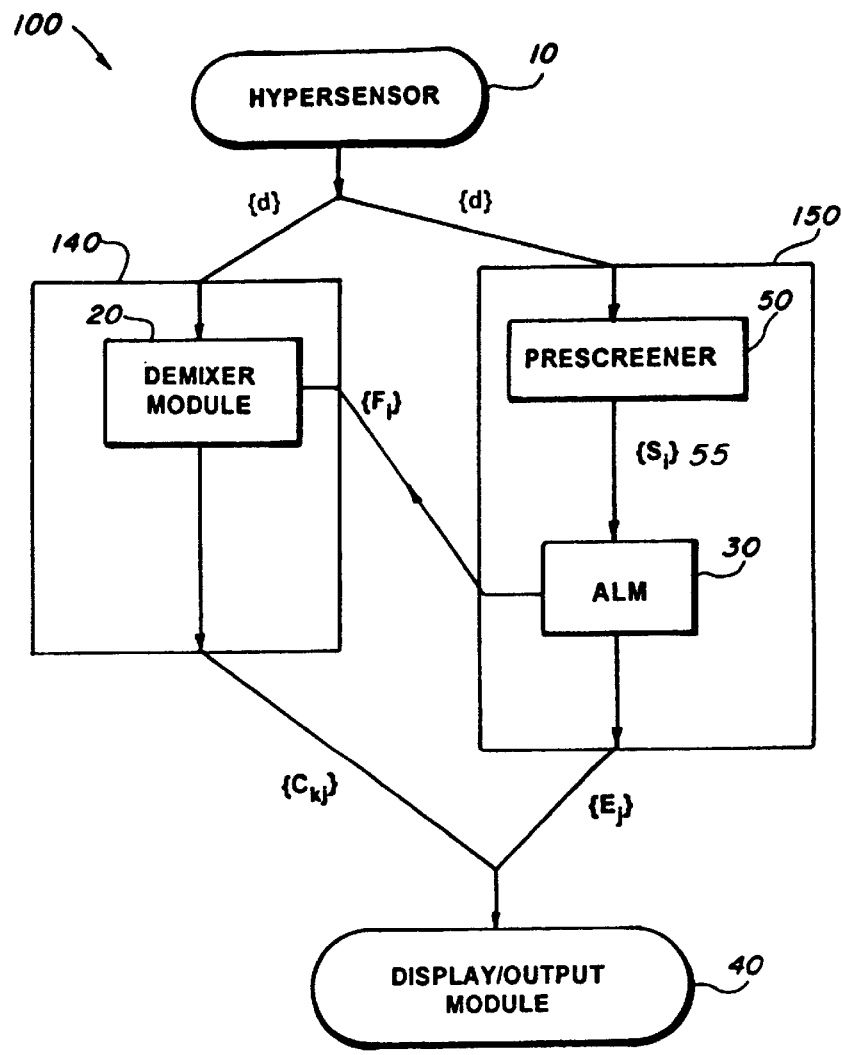
FIG. 2. is a block diagram of an embodiment of IHPS showing the system's parallel structure.

Referring now to FIG. 2, which shows a block diagram of the basic IHPS system architecture, the data from the sensors d 200 is entered into a processing system 100 which employs a parallel-pipeline architecture. Hypersensor 10 collects data and simultaneously transmits the collected data d 200 through two separate processor pipes, one for demixing 140, and one for adaptive learning operations 150. In demixer pipeline 140, demixer module 20, decomposes each pattern vector into a convex combination of a set of fundamental patterns $c_{kj}$ which are the constituents of the mixture. The decomposition is accomplished using projection operations called 'Filter Vectors' $F_j$ generated in adaptive learning pipeline 150, by adaptive learning module 30.

Prescreener 50 constructs a survivor set/exemplar set by extracting exemplars, or data collected by hypersensor 10 which may contain new or useful information. The signature pattern of a weak constituent or an unresolved small target is separated from background patterns which may hide the target pattern in the unmixed data. A priori knowledge about the signatures of known targets can be used, and approximate signatures of unknown constituents are determined automatically. Information detailing the composition of the demixed data patterns is sent to Output Module 40, along with information about the fundamental patterns and Filter Vectors. Learning module 30, performs minimization operations and projects the exemplar set information into a reduced dimensional space, generating endmembers and filter vectors.

For other types of hypersensors, the spectral vectors produced by the sensor array would be replaced by a vector of other types of data elements, such as the amplitudes of different frequencies of sound. The organization of input data vectors may also vary somewhat depending on the type of sensor. Aside from these sensor-dependent variations in the type and organization of the input data, the operation, capabilities, and output of the processing system would remain the same.

The parallel processing architecture illustrated in the FIG. 2 is a preferred structure, however, this system, algorithms and hardware contained herein may be employed in a system with a traditional architecture. The demixer processor pipeline 140 comprises demixer module 20 which decomposes each data vector $d_k$ into a convex combination of a set of fundamental patterns, which are endmembers or constituents of the mixture. The decomposition is accomplished using projection operators called 'Filter Vectors' generated by the adaptive learning module 30.

The filter vectors are the column vectors of minimum magnitude constituting matrix $\underline{\underline{F}}$ such that:

$$\underline{\underline{F}}^T \underline{\underline{E}} = \underline{\underline{I}}$$

$\underline{\underline{I}}$ is the identity matrix, and $\underline{\underline{E}}$ is the matrix whose columns are the endmember vectors. If the vector space defined by the endmembers is N dimensional, and each data vector d is a convex combination of the endmembers plus a noise vector N, then:

$$d = c_1 E_1 + c_2 E_2 + \ldots + c_1 E_n + N$$

Where $c_1, c_2, \ldots, c_n$ are real, non-negative, numbers, and $E_1, E_2, \ldots, E_n$ are the endmember vectors of the system. Stated alternatively:

$$d = \underline{\underline{E}} c + N$$

Where c is the column vector whose elements are $c_1, c_2, \ldots, c_n$.

Filter vectors allow the signature pattern of a weak constituent or unresolved small target to be separated from background patterns which may hide the target pattern in the spectral data. Filter vectors demix the spectrum by projecting out one endmember at a time.

CHOMPS is not limited to filter vector manipulations to demix the spectrum. There are several methods known in the art to demix the spectrum, such as the use of spectral matched filers (SMF) or pseudoinverses, any of which may be suitable for compression use.

Information vector c detailing the composition of the demixed data spectrum is sent to Display/Output module 40 from the demixer module through the demixer pipeline 140, along with endmembers E about the fundamental spectra patterns, and filter vectors from adaptive learning module 30 via the adaptive learning pipeline 150. Display/Output module 40, displays the distribution of the constituents of the scene, transmits, or stores the demixed data for later analysis.

The adaptive learning pipeline 150 comprises prescreener 50, and adaptive learning module 30. The object of prescreener 50, is to generate the exemplar set {S} to a user specified precision by comparing each incoming spectral vector d to the updated exemplar set {S}.

Figure 3:
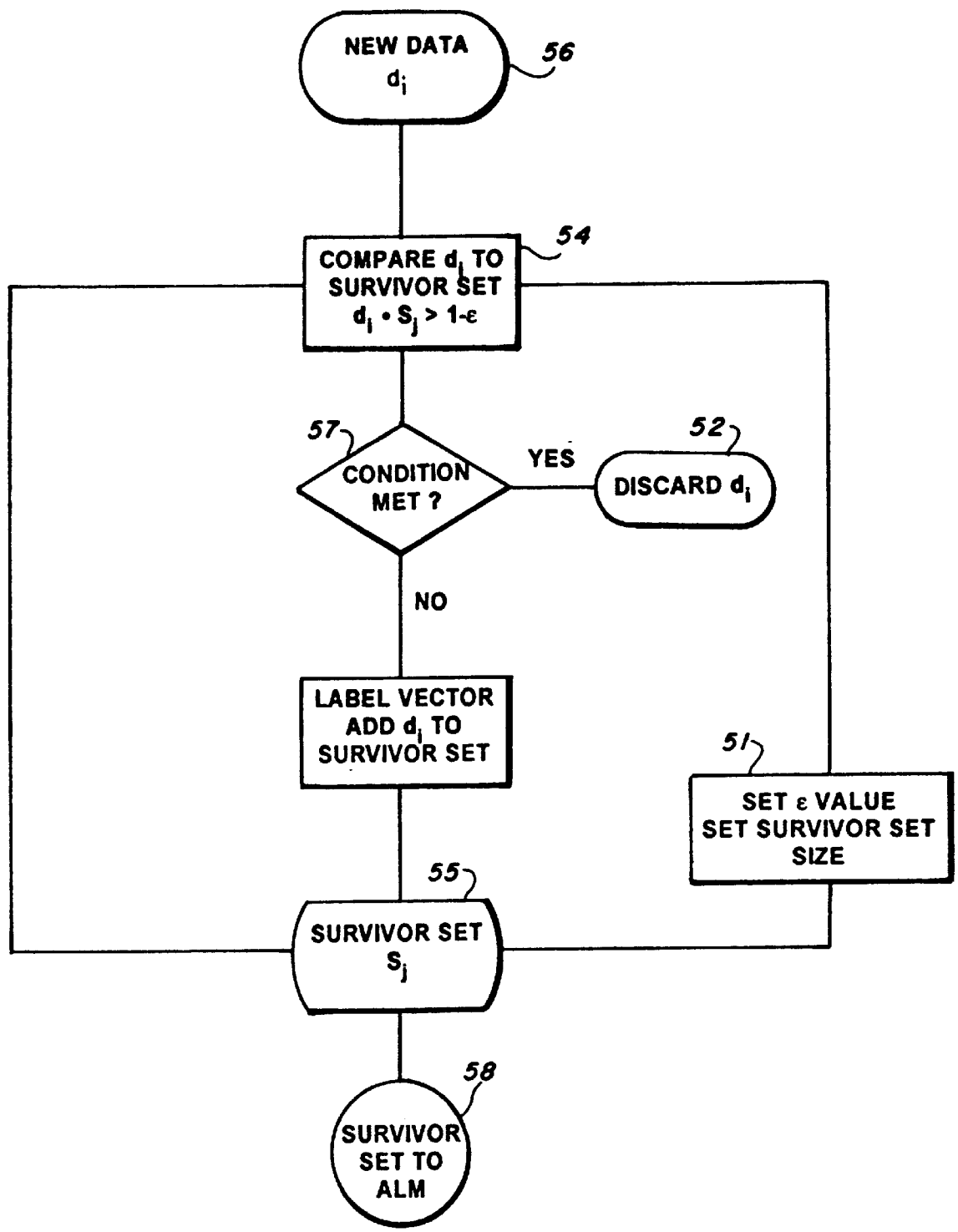
FIG. 3. is a logic flowchart of the operation of the prescreener

Referring now to FIG. 3 which shows a logical flowchart for the operation of prescreener 50, once the prescreener 50 receives data vectors d from preprocessor (not shown), prescreener 50 generates a reduced set of vectors or exemplar ensemble called the survivor or exemplar set 55. Exemplar set 55 is then transmitted to adaptive learning module 30. Prescreener 50 reduces the amount of data processed by discarding spectral signatures which contain redundant information. This reduces the computational burden on the other elements of the learning pipeline. The exemplar set 55 is generally less than 1% of the total input stream, but its size varies depending upon the conditions and applications.

Figure 14:
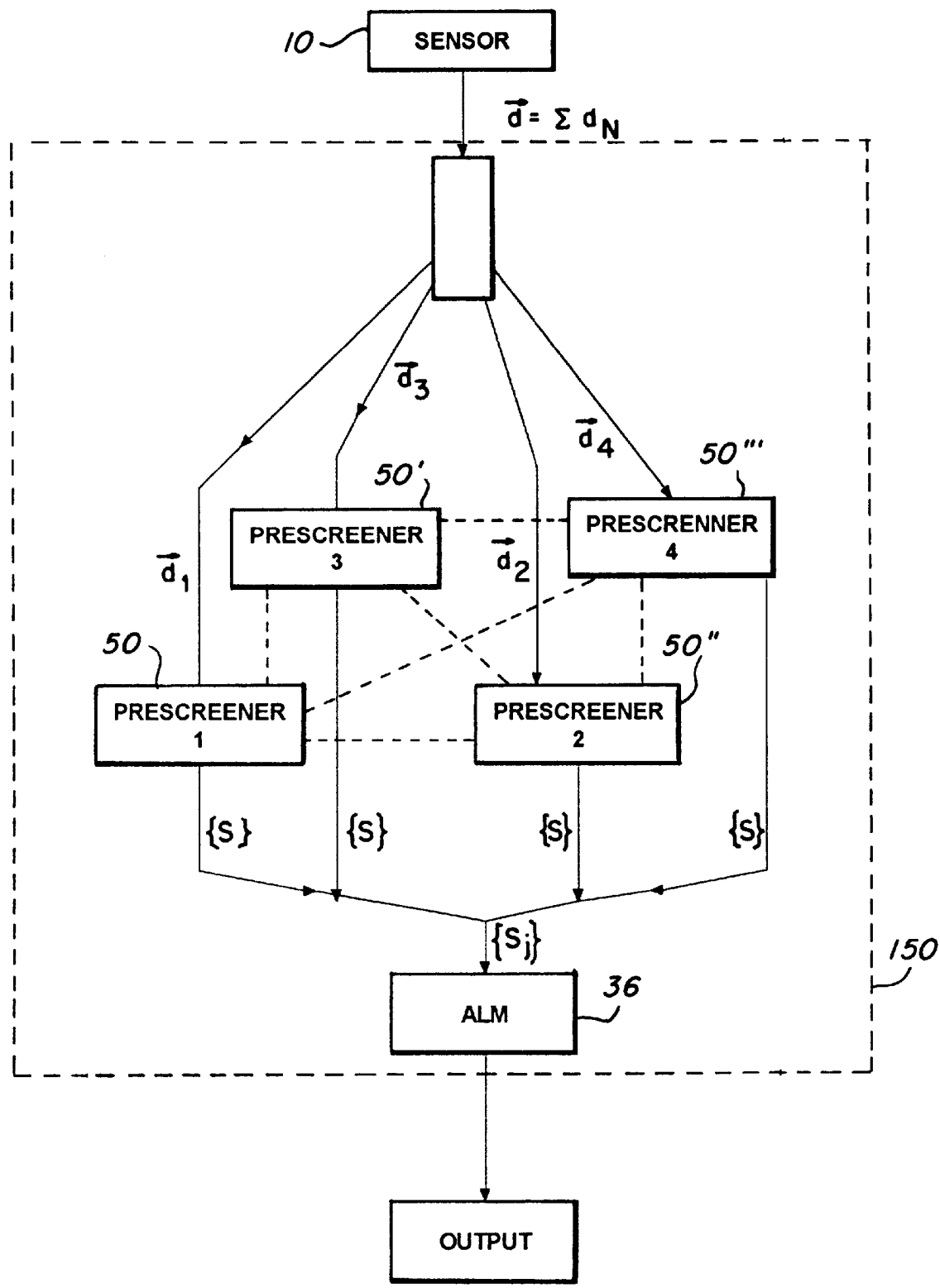
FIG. 14. is a block diagram of the ALM processor pipeline employing multithreaded operation.

In CHOMPS, prescreener 50 is implemented in several different ways, depending on the application's timeliness requirements and the processing system hardware. In a preferred embodiment the prescreener module is implemented using multithreaded or messaging multiprocessor operation. Referring now to FIG. 14 which shows a block diagram of ALM processor pipeline 150 employing multithreaded operation, data generated by sensor 10 passes through multiple processor pipes 49. The data set is segmented so that each prescreener 50 processes a different section of the input stream. Prescreeners 50 are coupled to allow each prescreener 50 to share exemplar set information, updating and receiving updates from the other prescreeners. This allows each prescreener 50 to build a complete exemplar set {S} which reflects the exemplars extracted from vector data set {d} by each prescreener 50. In multithreaded operation the prescreeners 50 can also be decoupled, for independent operation. In this mode, each prescreener 50 processes the complete data set, and a separate software module (not shown) reconciles the output of the parallel prescreeners into a single exemplar set.

The complete and updated exemplar set {S} is then passed to the ALM 30 for endmember generation. The endmember data and filter vectors are passed to the output module.

CHOMPS is thus able to quickly and efficiently sample a very large data set and generate a exemplar set by prescreening large "chunks" of the data set {d} simultaneously. Coupled with the CHOMPS compression and computational management techniques discussed throughout this text, the ability to employ parallel processing at the prescreener level results in a substantial improvement in the efficiency of IHPS, significantly extending the real time operation envelope.

The multiprocessor configuration illustrated in FIG. 14 may also be employed using multiple prescreeners distributed in a network of machines. CHOMPS is also capable of being employed using a single threaded operation, where each vector is processed sequentially by a single processor.

Referring now to FIG. 3, which illustrates a flowchart of the logical operation of prescreener 50, prescreener 50 constructs the exemplar set $\{S\}$ by comparing 54 the data spectra of the most recent pixel sampled with existing members of the exemplar set 55. The exemplar set is generated by performing dot operations in accordance to the relation:

$$d_i \cdot S_j > 1-\epsilon$$

where, $d_i$ is the with newly sampled data vector, $S_j$ is the jth existing exemplar set vector, and $\epsilon$ is variable controlling threshold sensitivity. Here, the vectors $d_i$ and $S_j$ are assumed to be normalized to unit magnitude. Thus, the condition $d_i \cdot S_j = 1$ means that the two vectors are identical and the condition $d_i \cdot S_j > 1-\epsilon$ means that they are almost identical if $\epsilon$ is small. Vectors for $d_i$ which meet the above condition 57 for any exemplar $S_j$ are discarded 52 and the next vector is examined. Discarded vectors are not included in the exemplar set. The rejection count for each exemplar is stored in an array for future recall. The value of $\epsilon$, which is set by the operator or a control system, is a function of the exemplar set size desired, memory length for exemplar set values, desired thruput of data and the noise in the signal 56. Generally, as the value of $\epsilon$ is increased, the sensitivity of the system is decreased. The pruner 51 is a memory management device which determines when a exemplar set vector $S_j$ should be purged from the memory. Pruner 51 monitors the exemplar set 55, and adjusts the control parameters to control exemplar set size. This is accomplished by setting the value for $\epsilon$ 54, and the maximum allowed age of a exemplar, which determines the threshold for additions to the exemplar set and the time a exemplar is allowed to remain in the exemplar set $\{S\}$ without being regenerated.

Exemplar set vector, $S_j$, used in the $d_i \cdot S_j > 1-\epsilon$ comparison is preferably chosen via the use of a structured search technique to minimize the number of dot operations while offering thorough analysis of the exemplar set 55. This may be accomplished by comparing 54 the newly sampled data vector $d_i$ with the most recent vectors entered into the exemplar set $\{S\}$. Other search methods which minimize the number of operations necessary for thorough matching are also suitable. CHOMPS employs several such structured techniques designed to minimize the number of operations necessary for effective prescreener operation discussed in detail below.

The computational management techniques employed by CHOMPS is referred to as Focus searching. Focus searching includes priority searching and zone searching which generally relate to focusing the comparisons of the incoming data vector $d_i$ to the exemplars $S_j$ so that relevant exemplars can be quickly located, and to reduce the number of exemplar comparisons necessary, before a determination can be made as to whether a new data vector $d_i$ is similar to an existing exemplar $S_j$.

In a priority search CHOMPS will assign a higher priority to some exemplars than others on the basis of an exemplars age, past comparisons or some other statistical basis. The exemplars designated with the higher priority are initially used in the $d \cdot S > 1-\epsilon$ prescreener comparison. Exemplars with a lower priority are used later, if necessary.

In a preferred embodiment, one such computational management technique CHOMPS employs is in the form of a priority search technique called a Pop-up test. The pop up test uses a data structure called a pop up stack. The pop-up stack is a subset of the exemplar set $\{S\}$ containing only the exemplar vectors $S_j$ that most recently rejected an incoming spectral data vector $d_i$. The pop up stack us comprised of the most recent exemplar entry, and the exemplar that most recently rejected a candidate exemplar. When a data vector is determined to be dissimilar from the other exemplar set members it is entered into the pop up stack.

Figure 16:
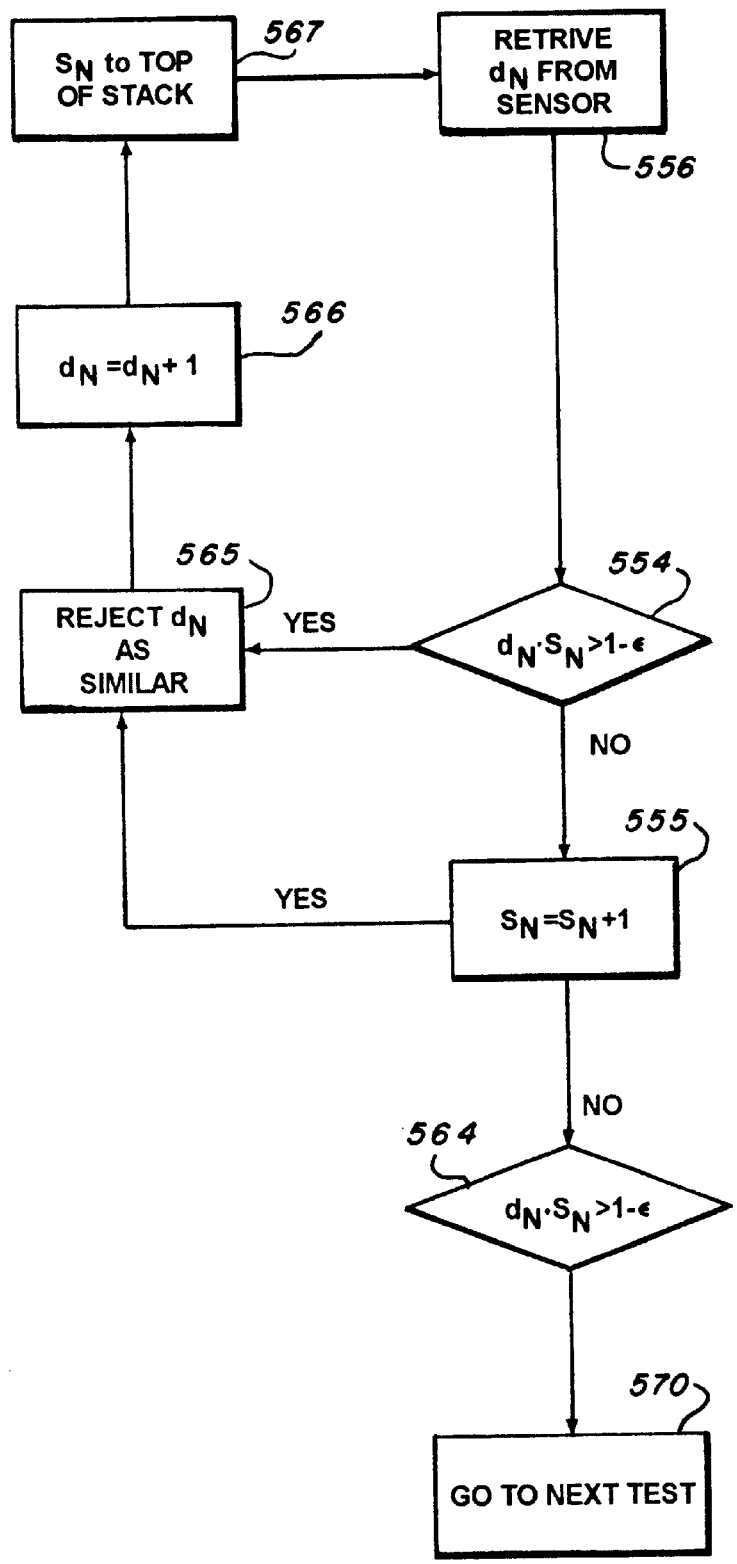
FIG. 16. is a logic flowchart of the Pop-up Stack search method.

Referring now to FIG. 16, which shows a flowchart of the pop up stack test, prescreener first receives a data vector $d_N$ from the sensor 556, where N is just the order in which the vector is received. Prescreener then performs the standard dot product comparison to determine if $d_N$ is similar to $S_j$. If the condition in the inequality is met, $d_N$ is rejected as similar to $S_j$ or repetitive data 565 and the next data vector $d_{N+1}$ is retrieved, 566. $S_j$ is then placed at the top of the stack 567, resulting in the next data vector sampled being compared to $S_j$ first. If the condition is not met, the prescreener retrieves the next exemplar in the stack $S_{j+1}$ 555, and repeats the $d_N \cdot S_j > 1-\epsilon$ comparison 564 where $S_j = S_{j+1}$. If the condition is met, prescreener again rejects $d_N$ as similar 565, places $S_{j+1}$ at the top of the stack 567 and retrieves the next data vector $d_{N+1}$ for comparison 566, 556. If the condition is not met, the prescreener will go on to the next text 570.

The pop up stack thus gives priority to the last exemplar to reject a data vector as similar. Called a rejector, this exemplar is statistically more likely to be similar to the next incoming data vector than an exemplar with a more distant rejection history. Thus the pop up test improves the chances of quickly classifying a vector as similar with a single comparison operation. Other variations of the pop up stack are possible, for instance the newest rejector may not be assigned highest priority (used in first comparison), it may just be given a higher priority the majority of the other exemplars.

Preferably, the pop up test is performed for no more than 2 or 3 cycles, however, multiple iterations of the pop up test may be performed. In the preferred embodiment, after 2 or 3 cycles, CHOMPS next performs a Zone search.

In a zone search CHOMPS chooses a point of reference, and defines the exemplar set $\{S\}$ and the incoming data vectors d according to their relation to the reference. The exemplar data set $\{S\}$ is labeled and stored according to some defined relationship with the reference point structured to allow the prescreener to quickly recall exemplars $S_j$ which meet parameter in relation to data vector $d_i$. Thus CHOMPS can use the incoming data vectors relation to the reference point to define a zone of exemplars to compare with $d_i$ and determine whether the incoming data vector $d_i$ contains new information.

In a preferred embodiment CHOMPS designates a vector as a reference point. These vectors are referred to as reference vectors. The reference vector is used as a reference point from which the vectors of the exemplar set $\{S\}$ and data set $\{d\}$ are defined. Reference vectors may be arbitrary, however a further reduction in the number of computations necessary is achieved if the reference vectors are selected such that the exemplar projections yield the maximum possible spread in each reference direction. Reference vectors may be chosen as approximations to the largest principal components of the current exemplar set. Alternatively, the reference vector may be initially chosen arbitrarily. This would likely be so immediately after the system has started up: at that time, the endmembers are themselves arbitrary and thus using them to form the reference vector would have no value. Once the prescreener constructs the exemplar set, CHOMPS would preferably use a Principal Components Analysis to designate one or more reference vectors. This is done by inspecting the values of each component of each endmember, and form the reference vector from the largest value of each component, e.g. for the n elements of the endmembers, inspect the first element of each endmember and making the largest the first element of the reference vector, and do the same for the second, third, etc., element until the reference vector is formed. If one wishes plural reference vectors (e.g. the embodiment of FIG. 18, discussed below), one can repeat this for the second largest components, third largest, etc.

In the Principal Components Analysis, CHOMPS uses the exemplar vectors as well as the rejection count for each exemplar to estimate the covariance matrix. As more image pixels arrive, the reference vectors are updated, based on mission requirements and considerations as to whether an update is beneficial. In CHOMPS, the data vectors are addressed on the basis of their projection onto the reference vector.

Figure 15:
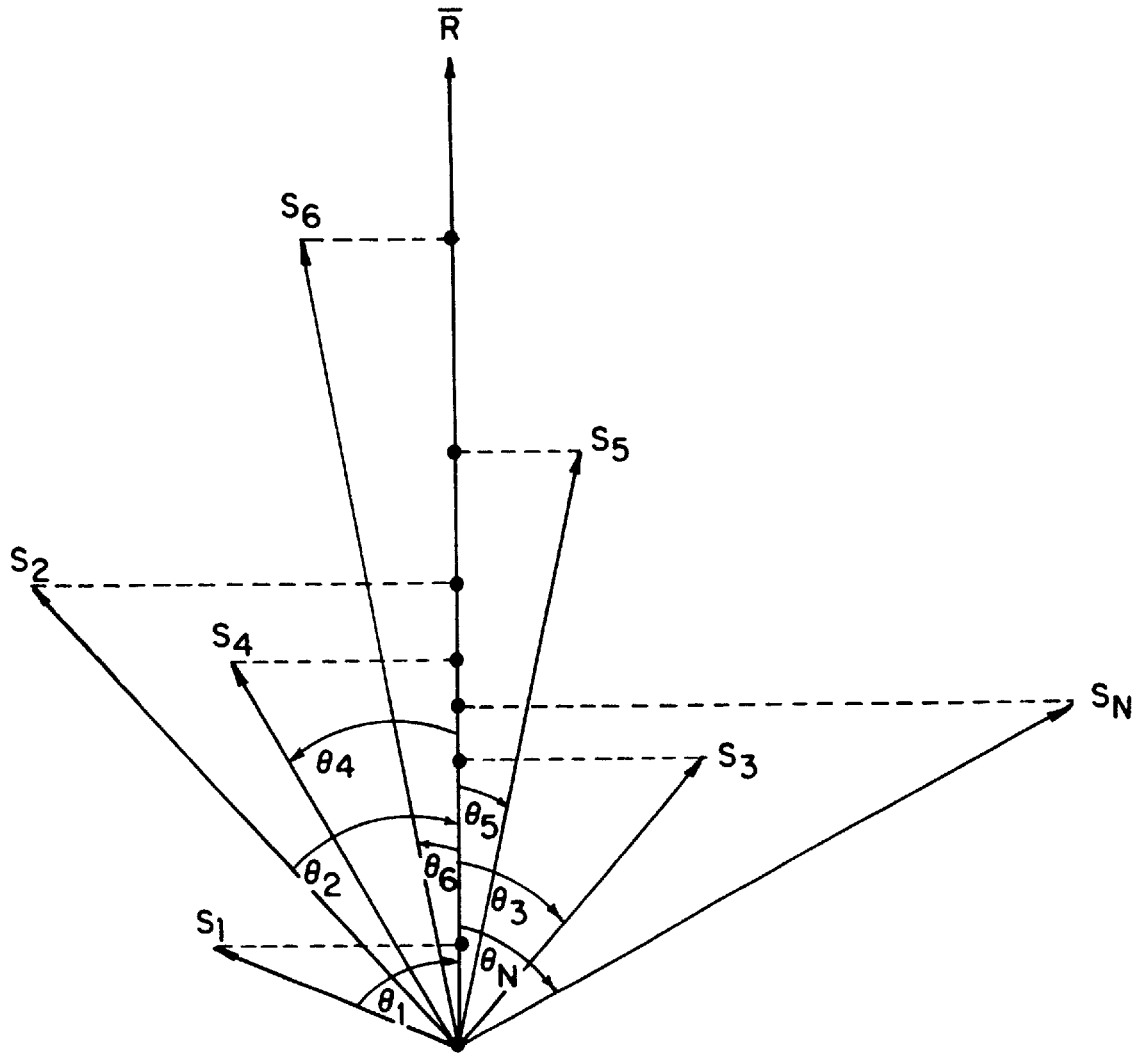
FIG. 15. is a representation of a reference vector and its exemplar projections.

Referring now to FIG. 15 which illustrates a reference vector R and exemplar set vectors $S_N$ projected onto it, the angle $\theta_N$ between the reference vector and each incoming data vector is computed. The reference angle for each exemplar is stored in an array or table along with a notation designating which vector the angle $\theta_N$ represents for future recall.

In a preferred embodiment the exemplar set data, the exemplar number and its orientation to the reference vector is contained in a linked list or hash table, known in the art, such that each exemplar can be quickly located and recalled by the prescreener as a function of the reference angle $\theta_N$. A hash table is a list consisting of a tabulation of angular bins spanning the angular range into which all data vectors d will lie, e.g. 360 degrees, each bin being, e.g. several degrees. Associated with each bin is a list of exemplar vectors whose angles with respect to the reference fall within the bin. Thus, the actual reference angle need not be stored, the reference angle is determined as a function of which address the entry occupies. As new entries to the linked list are made the address pointers are changed, rather than shuffling and reloading the entire array each time an exemplar is changed. In particular, as each new data vector d arrives, its angle with respect to the reference is determined, and the bin corresponding to that angle identified. To determine whether vector d matches any exemplar vector, one need only compare d with the exemplars associated with that bin, not all exemplars, making the search more efficient.

A preferred embodiment of CHOMPS also uses a form of the Bullseye test to locate the exemplars in the current exemplar set which are likely to reject the new data vector d as similar.

In the Bullseye test, CHOMPS uses the data vectors projection on the reference vector in concert with the exemplars projection on the reference vector to eliminate all existing exemplars that could not possibly match the incoming vector. CHOMPS accomplishes this by constructing a cone which defines the zone in which possible matches may occur and excluding exemplars which do not fall within that range.

The bullseye test uses the angle defined by the new data vector and the reference vector to locate all exemplars in the current set that match the new spectral vector to the specified angular precision $\theta_\epsilon$ about the reference where $\theta_\epsilon = \cos^{-1}\epsilon$. Those exemplars are then used by the standard prescreener comparison inequality $(d_i \cdot S_j > 1 - \epsilon)$ to make a determination as to whether $d_i$ is similar to $S_j$.

Figure 17:
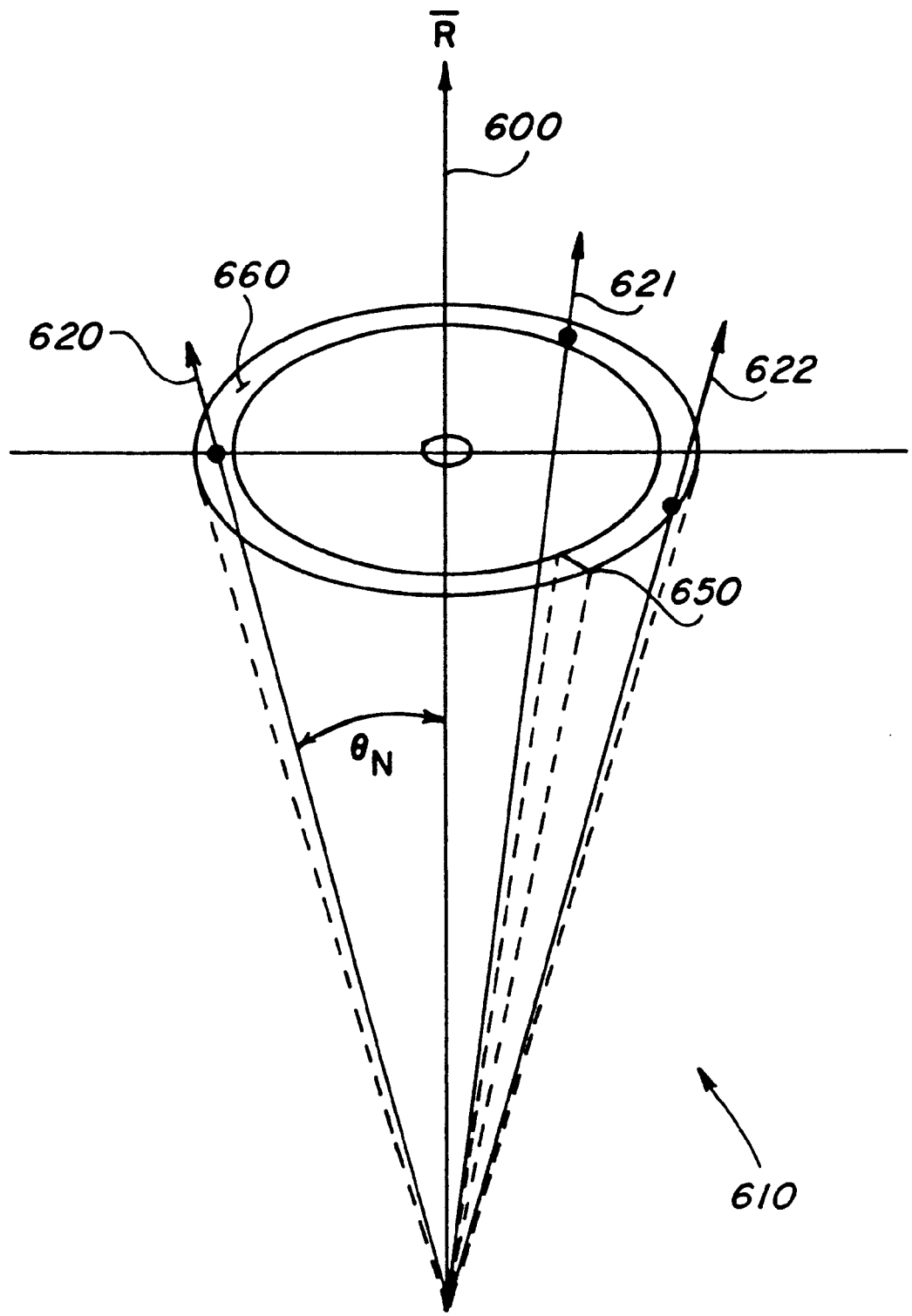
FIG. 17. is a representation of the Single Bullseye search method in vector space.

FIG. 17 illustrates reference vector R 600 and cone 610 defining a range in which a possible match (rejecting exemplar) may occur. Only exemplars within match zone, 620–622 will be compared to the new data vector. These exemplars, contained in match zone 650, which form an annulus having a center at $q_i$ 660 with maximum thickness $2*\epsilon$, are representative of those vectors which have similar projections onto the reference vector within the selected precision. If an exemplars projection does not fall into the match zone, there is no need to compare that exemplar the to data vector $d_i$ because there the data vector $d_i$ cannot be similar within the desired precision, defined by the thickness of match zone 650.

In the bullseye test CHOMPS determines which vectors lie within the annulus by keeping an indexed list of entries in the exemplar table, ordered by angle to the reference vectors, e.g. a hash table, link-list, or other appropriate search structures. Once the zone is computed (i.e. $\theta_\epsilon$), a zig-zag search is performed where the candidate vector is compared to the exemplars with angles starting at $\theta_0$. To perform this search, one addresses the angle bin in the hash table corresponding to vector d's angle with the reference vector, and tests whether d and any of the exemplars S associated with that bin match. If not, the exemplars in the next adjacent bins are similarly addressed. This continues, addressing bins above and below the first addressed bin, and further away from the first addressed bin, i.e. bins associated with angles which differ from d's angle by increasingly large amounts. In this manner, d is compared first to exemplars with the highest likelihood of a match, based on the relative angular orientation of d and the exemplars, making it likely that, if there is a match, it will show up quickly, thus increasing computational efficiency. If the entire zone does not produce a match the vector is determined to contain new information, designated as a new exemplar and added to exemplar set $\{S\}$.

Thus through the use of reference vector R and the bullseye test, the number of comparisons necessary to test the entire exemplar set are reduced from several thousand, to something on the order of 20, on the average.

Figure 18:
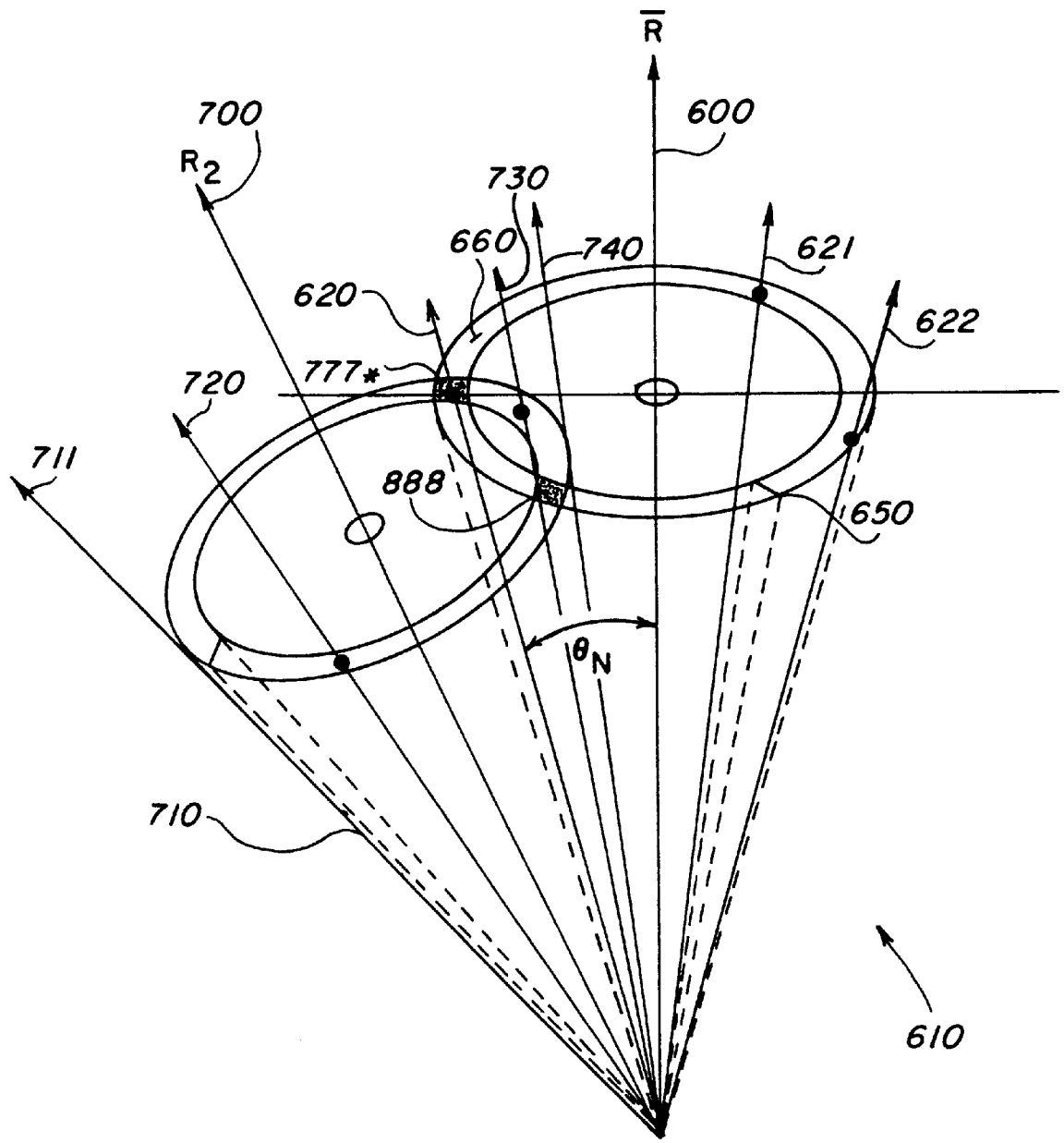
FIG. 18. is a representation of the Double Bullseye search method in vector space.

In an alternative embodiment of the bullseye test a substantial increase the precision and speed of the search is realized by designating multiple reference vectors, each one having its own associated bullseye. One such embodiment is depicted in FIG. 18, which shows what may be described as a double bullseye cone. A first cone 610 is defined in relation to reference vector R and the second cone 710 is defined in reference to second reference vector $R_2$ 700. Exemplars that are candidates to match the new data vector are located within the intersection of the match zones for each reference vector 777* and 888. Through the use of multiple bullseyes defined by multiple reference vectors, the "hot zone" or area in which a likely matching exemplars must reside is reduced. Only the vectors which simultaneously occupy both match zones are possible matches and need be compared to the new data vector. Referring to the FIG. 18, the only vector which meets this test requirement is exemplar 620. In effect, one generates separate hash tables (or the equivalent) for the exemplars with respect to each reference vector. One then tests d against exemplars which are within a preselected angular distance from both references, e.g. by the zig-zag procedure or equivalent. Thus, CHOMPS is able to conclude that all exemplars in the data set are not rejectors (dissimilar to data vector d), with the possible exception of exemplar 620. By employing CHOMPS and a variation of the bullseye test, the prescreener is able to exclude the majority of the exemplar set from the prescreener's comparison test (every exemplar except exemplar 620), and designate the incoming data vector as similar or dissimilar to the exemplar set exemplars after a comparison of the data vector to exemplar 620, a single comparison.

Excluding the 2 or 3 comparisons for the pop-up stack, the only one dot product operation need be processed before the prescreener can determine whether the new data vector contains new data and should be added to the exemplar set.

Alternative embodiments of the zone type test may be employed to minimize the computational load on the prescreener depending on mission requirement and the precision desired. For example an avatar bullseye test may be employed. In the avatar bullseye test, only the exemplars with the highest vector rejection totals are used rather than the complete exemplar set.

In yet another version of the bullseye test, the match zone width can be diminished by a significant factor with minimal generation of redundant exemplars but with an increase of algorithm speed. For a candidate exemplar which makes an angle $\theta_0$ with the reference vector the width of the match zone is given by $\delta$ where:

$$\delta = 2\sin\theta_0 \sqrt{1 - \varepsilon^2}$$

The data set describing a scene may be processed using either of three modes which include the Automatic scene segmentation mode, the Full scene mode or the Adaptive/continuous mode.

In the Automatic scene segmentation mode, the scene is divided into a series of segments and is processed by the prescreener one segment at a time. One way to perform such a segmentation would be to partition data at points where the data has caused a decidedly "sharp" or "large" change in system dimensionality, i.e. the number of system Endmembers. Segment size is determined as a function of the exemplar set size. This variation offers several advantages, particularly when attempting to resolve dynamic scenes. With a dynamic or complex scene, in general, a larger exemplar set is required to maintain a specified precision. As the number of exemplars increases, the processing time increases very steeply and the compression ratio decreases. Automatic segmentation may also increase compression efficiency because the dimensionality and the exemplars added into a scene segment in a complex setting, only affect the segment that produced them, and not the possibly simpler segments that follow.

The full scene mode is identical to the Automatic segmentation mode, except that a scene is treated as one continuous dataset rather than a number of smaller segments. While operating in the single or multiple segmentation modes, the prescreener feeds the exemplar set to the Adaptive Learning Module (ALM) for endmember computation at the end of each segment or block of data.

In the Adaptive mode the same efficiency is accomplished by injecting a finite but renewable lifetime to the exemplars, that is, they are pushed to long term system memory, if they have not produced a spectral match with new vectors for predefined time/frame intervals. The lifetime of the individual exemplars depends on their relationship to the endmembers and the priority assigned to the importance of their spectral patterns. For example, exemplars that contain important subpixel objects are assigned longer lifetimes than ones containing variations of background substances.

In the adaptive/continuous mode an ALM cycle is triggered when new exemplars change the dimensionality of the enclosing subspace or when a new exemplar is defined that lies outside the subspace defined by the current endmember set or other criteria, which are mission dependent.

When a new exemplar is found, it can be projected into the orthogonal basis set produced by the ALM, to confirm whether the new spectrum produced a subspace dimensionality change. A projection in the endmember space, utilizing the current matched filter vectors, indicates whether the subspace has expanded past the bounds of the current space, determined by the shrinkwrap component of the ALM. Either test will signal a trigger to the ALM. Additional criteria, such as the number of image frames since the last ALM, are used to avoid triggering excessive numbers of learning cycles.

Referring again to FIG. 2, the exemplar set data, as computed by prescreener 50 is input 58 into adaptive learning module 30. Learning module 30, computes from the exemplar set, a set of endmembers {E} which together span the current scene. Endmembers are a set of fundamental patterns (vectors) from which any pattern vector in the data set can be reconstructed as a convex combination in reduced dimensional space, to within an error determined by the noise or other error criteria. The requirement that all of the observed spectral vectors $d_k$ be representable as convex combinations of conventional basis vectors, insures that the decomposition makes sense as a physical mixture of constituents, since any such mixture must have this property. The resulting patterns conform as closely as possible to signatures of actual constituents of the scene.

Figure 8:
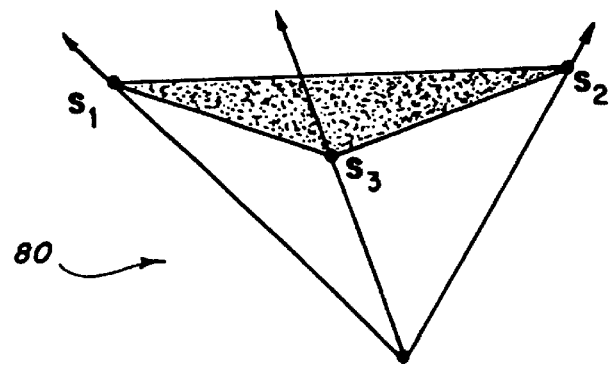
FIG. 8. is a representation of the 3-dimensional spanning space showing the salient vectors.
Figure 12:
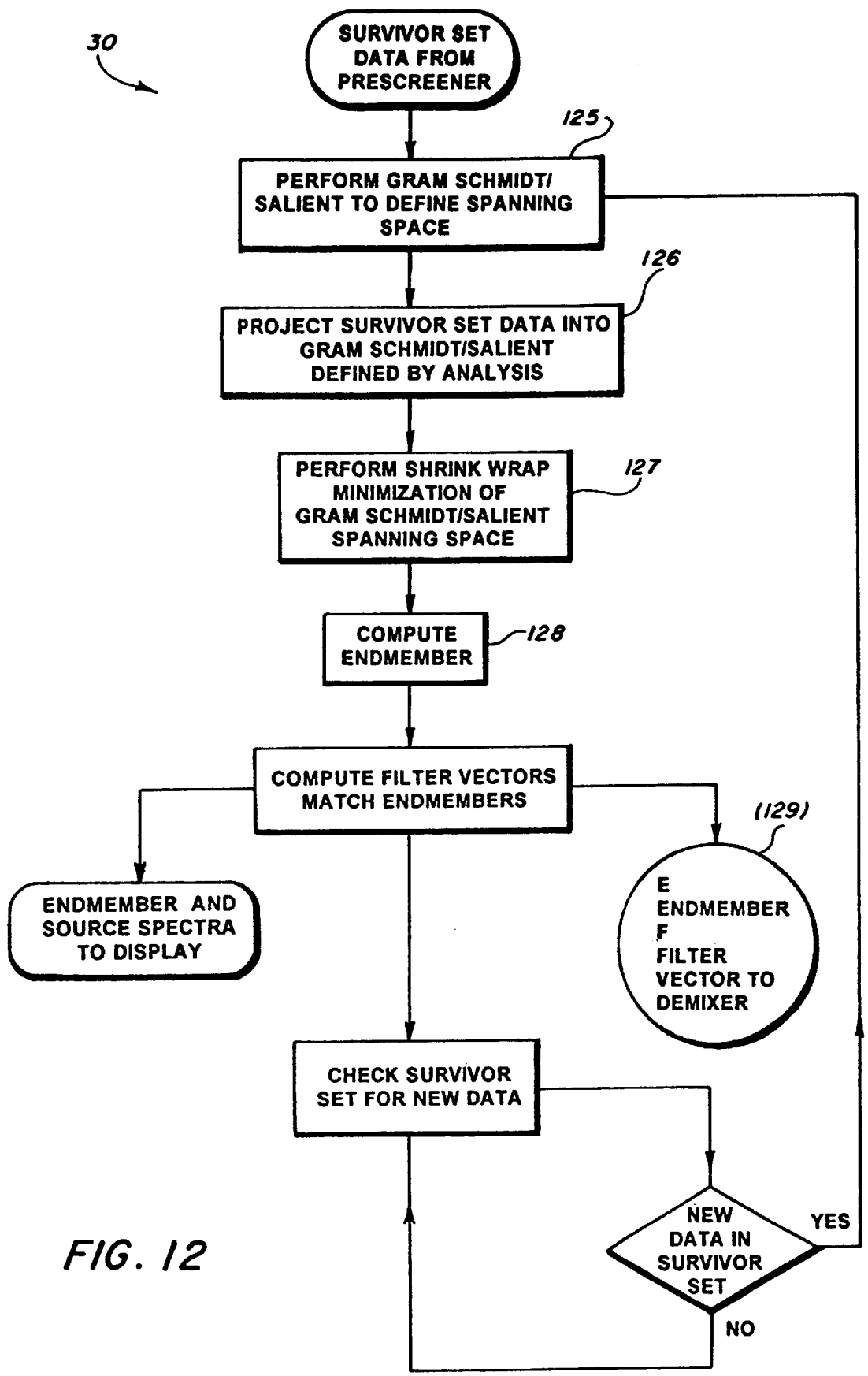
FIG. 12. is a logic flowchart of the operation of the adaptive learning module.

Referring now to FIG. 12, learning module 30, may employ an ordered Gram-Schmidt analysis using salients to construct a reduced dimensional spanning space 125, while retaining the spectral information contained in the exemplar set. The spanning space is constructed based on a spectral uniqueness hierarchy. The observed spectra of the exemplar set, expressed as vector data are then projected into the spanning space 126. A pixel purity determination algorithm may also be employed to define a subset of the salients, followed by a Gram-Schmidt analysis to complete the set. Computation of the endmembers is performed by learning module 30 by projecting the exemplar set data into a reduced dimensional spanning space using a Gram-Schmidt/Salient analysis of the exemplar set data, and employing shrink wrap minimization 127, to minimize the spanning space volume defined using Gram-Schmidt/Salient analysis. The endmembers are defined by the vertices of the hyper triangle defined by the minimized spanning space 128, as illustrated in FIG. 8.

Gram-Schmidt/Salient Analysis

The spanning space is defined by using a Gram-Schmidt/Salient analysis of the exemplar set vectors. In the parameter vector space which contains the exemplar set data, one first determines the two vectors which are furthest apart in the space, then, in the plane formed by these two vectors, select two mutually orthogonal vectors which lie in the plane. These mutually orthogonal vectors are for convenience called basis vectors, for reasons made apparent below. Next, select the vector in the data cube which is furthest from the plane and identify the hyperplane in which the basis vectors, and the newly selected vector, lie, and select a third basis vector such that it lies in the hyperplane and is mutually orthogonal to the other two basis vectors. This process is repeated, and one accumulates more and more mutually orthogonal basis vectors, until the most distant remaining vector is found to be within a preselected distance of the hyperplane containing all the basis vectors. At this point, the exemplar set vectors are projected onto the reduced dimensional space defined by these basis vectors.

Through the reduction of the dimension of the vector space in which one must work, CHOMPS correspondingly reduces the number of operations one must do to perform any calculation. Since none of the data vectors lie very far outside the hypervolume spanned by the basis vectors, projecting the vectors into this subspace will change their magnitude or direction very little, i.e. projection merely sheds components of each vector which were small already. Furthermore, because such components are necessarily too small to correspond to significant image features, these components are disproportionately likely to be noise, and discarding them will increase the system's signal to noise ratio.

Figure 4:
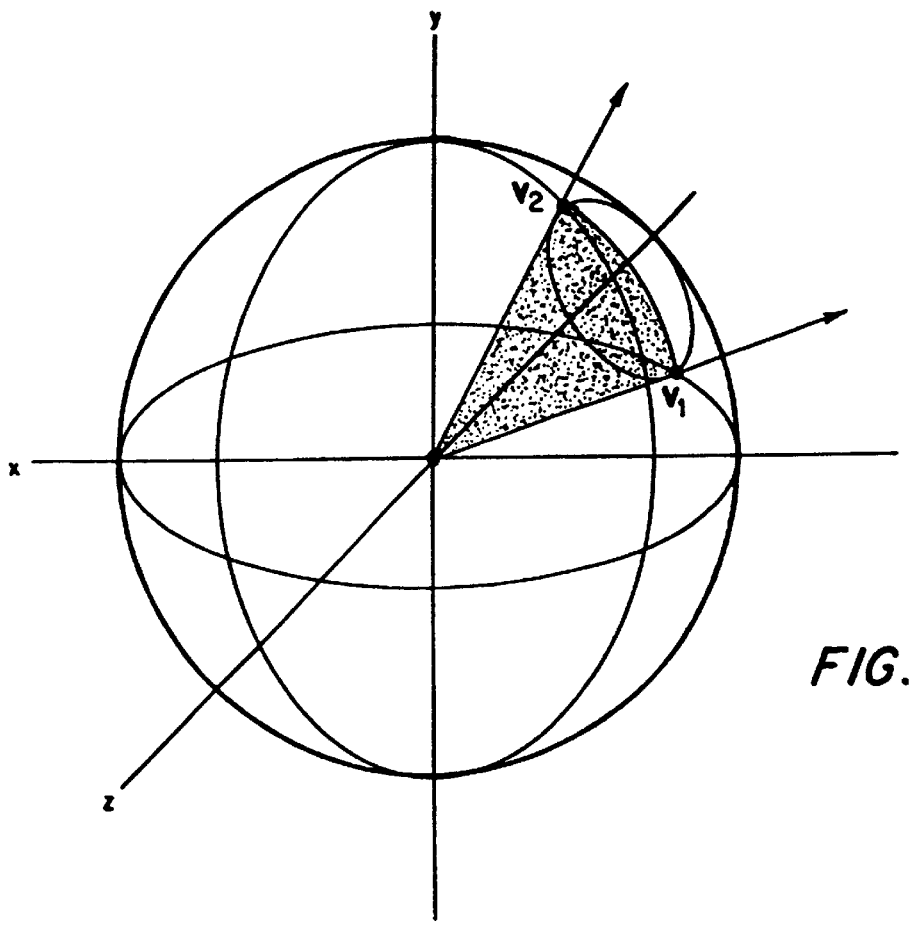
FIG. 4. is a representation of the plane created by $V_1$ and $V_2$ during Gram-Schmidt operations.
Figure 5:
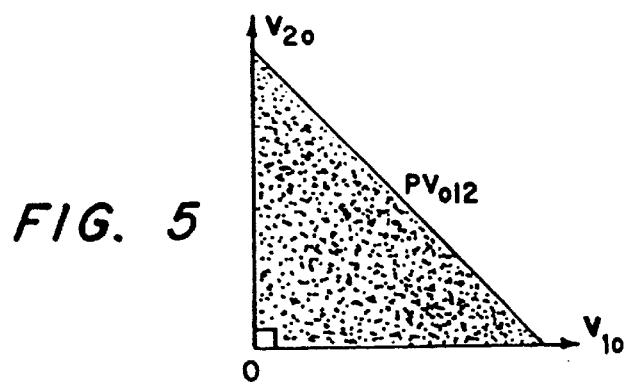
FIG. 5. is a representation of the orthogonal projections $V_{10}$ and $V_{20}$ during Gram-Schmidt operations.
Figure 6:
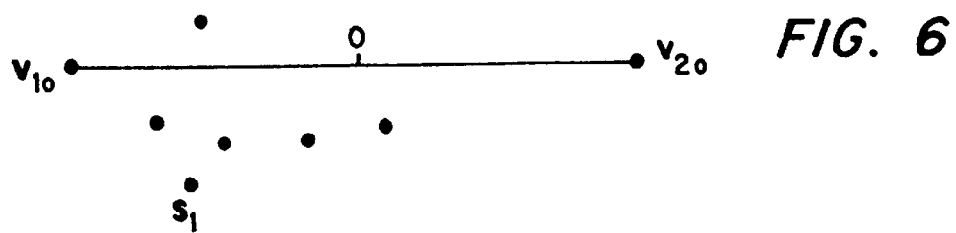
FIG. 6. is a representation of the Salient vector and plane defined by $V_{10}$ and $V_{20}$.
Figure 7:
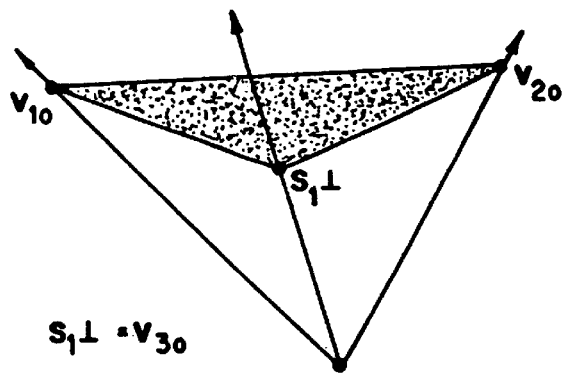
FIG. 7. is a representation of the 3-dimensional spanning space defined during Gram-Schmidt/Salient operations.

Gram-Schmidt\Salient analysis of the exemplar set data is performed in accordance with the following algorithm:

a) Designate the two exemplar vectors farthest apart, $V_1$ and $V_2$. FIG. 4 illustrates the orientation of $V_1$ and $V_2$ and the plane that $V_1$ and $V_2$ define.

b) Generate a 2 dimensional orthogonal set of basis vectors from $V_1$ and $V_2$ labeled $V_{10}$ and $V_{20}$ in the plane defined by $V_1$ and $V_2$, labeled as $PV_{012}$ as illustrated in FIG. 5.

c) Determine the salient vector (vector displaced farthest from plane) in relation to plane $PV_{012}$, defined in FIG. 6 as $\sim S_1$.

d) The salient $\sim S_1$ can be represented as a sum of vectors $S_1\perp$ and $S_1\|$, where $S_1\perp$ is orthogonal to the plane $PV_{012}$ and $S_1\|$ lies in the plane. Use the Gram-Schmidt procedure to find $S_1\perp$, and call this $V_{30}$. $V_{10}$, $V_{20}$ and $V_{30}$ now define a subspace in 3 dimensions. See the FIG. 7. representation of the subspace created by this step.

e) Select the salient $\sim S_2$ which is the exemplar vector farthest from the subspace defined by step (d).

f) Generate a new orthogonal direction from $\sim S_2$ defined as $V_{40}$. $V_{40}$ coupled with $V_{10}$, $V_{20}$, and $V_{30}$ now defines a subspace of 4 dimensions.

g) Steps (e) and (f) are repeated to define a spanning space of N dimensions. The distance out of the current subspace of the salient selected at each step is the maximum residual error which would be incurred by projecting all of the exemplars into the subspace. This decreases at each stage, until the remaining error is within a specified error tolerance. At this point the subspace construction process is complete. The value of N is the number of dimensions necessary to allow the projection of the exemplar set data vectors into the subspace while at the same time preserving important but infrequent signatures.

h) Project all of the exemplar set data into the spanning space defined in steps (a)–(g). The Gram-Schmidt\Salient analysis is the preferred subspace determination for CHOMPs, however CHOMPs is not limited to the Gram-Schmidt\Salient method for subspace determination. Other methods known in the art may be employed including but not limited to PCA methods, and Pixel Purity methods.

Shrink Wrap

Once the N-dimensional spanning space is defined, a convex manifold in the form of a hypertriangle within the spanning space is generated using shrink wrap minimization. Shrink wrap minimization of the spanning space is a simple optimization operation, that maintains the condition that all of the data vectors projected into the reduced dimensional space are contained within the hypertriangle. The vertices of the hypertriangle are the endmembers, and the volume defined by the hypertriangle itself is the locus of all possible mixtures (convex combinations) of endmembers. The shrink wrap process determines good approximations of the physical constituents of the scene (endmembers), by insuring that the shape and orientation of the hypertriangle conforms as closely as possible to the actual distribution of the data vectors (exemplars). The exemplars are assumed to be mixtures of the actual constituents. The number of endmembers is equal to the dimension of the spanning space.

Figure 9:
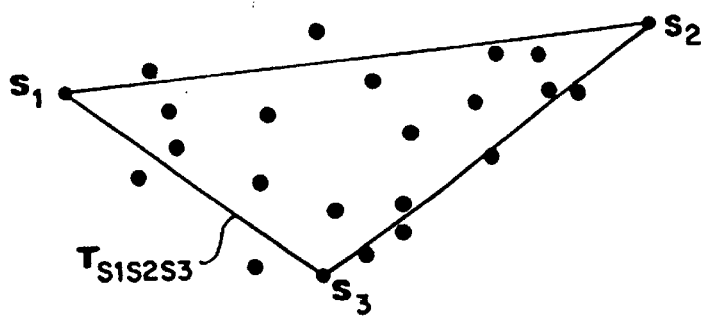
FIG. 9. is a representation of a hypertriangle convex manifold.

The salients may be used to guide the shrink wrap process. Referring to FIG. 8, hypertriangle $T_{S1S2S3}$ is defined by salient vectors, however, other vectors which include data may not be within the spanning space which $T_{S1S2S3}$ defines, as depicted in FIG. 9. The shrink wrap operation must satisfy the condition that all of the data vectors projected into the spanning space be contained within the volume defined by convex manifold $T_{E1E2E3}$. The shrink wrap operation starts with $T_{E1E2E3} = T_{S1S2S3}$ and then expands or contracts the triangle $T_{E1E2E3}$ by manipulating the vertices, $E_1$, $E_2$ $_{and\ E3}$ or by manipulating the orientation of planes that define $T_{E1E2E3}$, by the minimal amount to fulfill the above stated condition.

For purposes of example, the method described above and the following methods have been found effective, however, a combination of one or more of the disclosed methods, or any other minimization method which maintains the condition that the majority of the data vectors be contained within the minimized space is suitable.

Adaptive learning module 30 generates a set of filter vectors $\{F_i\}$ and endmembers $\{E_1, E_2, E_3 \ldots E_N\}$ in accordance with one of the following procedures, or variants thereof:

Method 1

Figure 10A:
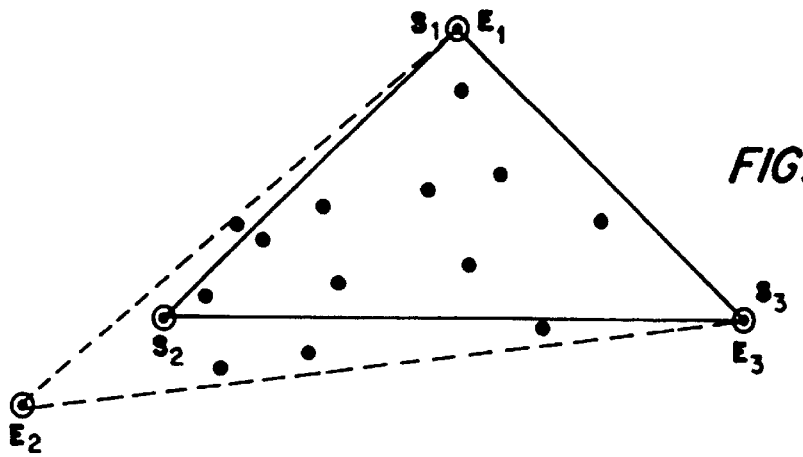
FIG. 10a. is a representation of a minimized hypertriangle defined using shrink wrap method 1.

With reference to FIG. 10a, find a set of endmembers $\{E_i\}$ such that each endmember $E_i$ is matched to a salient vector $\sim S_i$, and is as close as possible to its salient, subject to the condition that all the data vectors are inside the hypertriangle with vertices $\{E_i\}$. I.e., minimize $$C = \sum_{i=1}^{N_D} (E_i - S_i)^2$$

subject to the constraints $F_i \cdot d_k \geq 0$ for all i and k where $N_D$ is the number of dimensions. The filter vectors are computed from the candidate endmembers as described above. This constraint condition means that all the coefficients of the decomposition of $d_k$ into endmembers are non-negative, which is equivalent to saying that all $d_k$ are inside $T_{E1E2\ldots EN}$. This is a nonlinear constrained optimization problem which can be solved approximately and quickly using various iterative constrained gradient methods.

Method 2

Figure 10B:
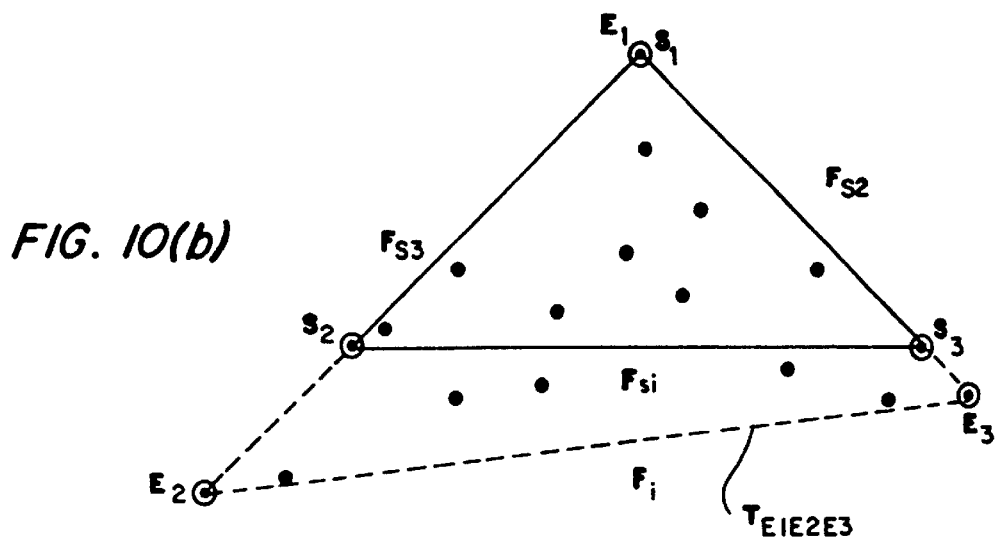
FIG. 10b. is a representation of a minimized hypertriangle defined using shrink wrap method 2.

Compute a set of filter vectors $\{F_{si}\}$ from the salients $\{\sim S_i\}$, using the formulas previously provided. These vectors will not, in general satisfy the shrink wrapping constraints see FIG. 10b. Find a new set of Filter vectors $\{F_i\}$ such that each Filter vector $F_i$ is matched to a salient Filter vector $F_{si}$, and is as close as possible to its salient filter, subject to the condition that all the data vectors are inside the hypertriangle. I.e., minimize $$C = (F_i - F_{si})^2$$

subject to the constraints $F_i \cdot d_k \geq 0$ for all k. This is a set of independent quadratic programming problems with linear constraints, which can be solved in parallel using standard methods. The decoupling of the individual filter vector calculations increases computational efficiency. Manipulation of the Filter vectors instead of the endmember vectors is equivalent to manipulating the plane faces of the triangle instead of the vertices. Given solutions for the Filter vectors, find the endmembers using the same procedure used to compute Filter vectors from endmembers (the defining relationships are symmetric except for a normalization constant).

Method 3

Figure 11:
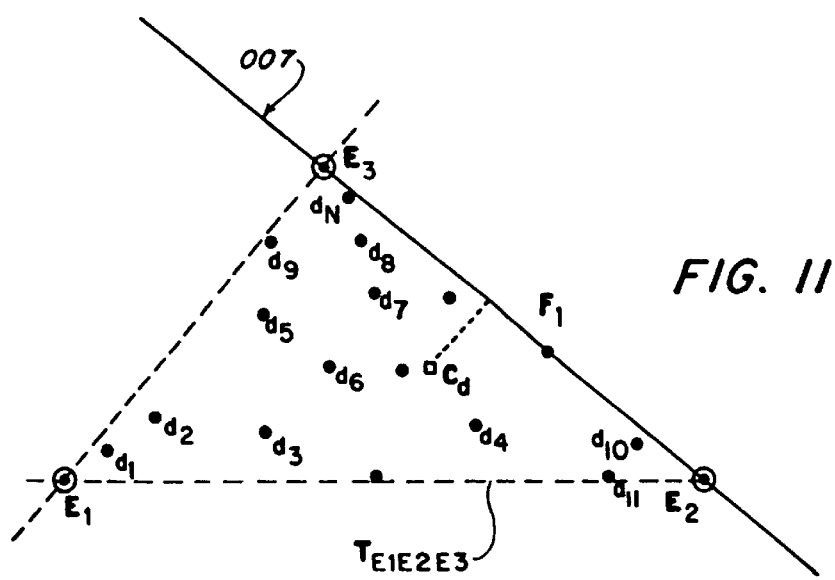
FIG. 11. is a representation of a minimized hypertriangle defined using shrink wrap method 3.

With reference to FIG. 11, find an approximate centroid $C_d$ of the set of exemplar vectors, and then find the hyperplane of dimension one less than the dimension of the enclosing space which is closest to the centroid. Hyperplane 120 divides the complete subspace into two halves, and the minimization is subject to the constraint that all the exemplar vectors $d_k$ must be in the same half-space as the centroid $\{C_d\}$. The normal to the optimal hyperplane 120, is $F_1$, the first filter vector. and the condition that all the exemplars are in the same half-space is equivalent to the constraint that $F_1 \cdot d_k \geq 0$ for all k. This process is equivalent to finding a vector $F_1$ with a fixed magnitude which minimizes the dot product $F_1 \cdot C_d$ subject to the constraint $F_1 \cdot d_k \geq 0$ for all k. As such it is amenable to solution using conventional constrained optimization methods. The hypertriangle $T_{E1E2E3}$ can be constructed out of a set of suitably chosen optimal (locally minimal distance to the centroid) bounding hyperplanes which form the faces of the convex manifold. The normal to each face defines the associated filter vector. Again, the endmembers can be determined from the Filter vectors at the end of the shrink wrapping process.

Referring to FIG. 12 and FIG. 2, once the endmembers and filter vectors are computed adaptive learning module 30 stores this endmember and filter vector data, along with data reflecting the exemplar set, and source vectors 33 for future recall. The adaptive learning module 30 then searches the exemplar set for any changes 148. If the system detects change in the exemplar set 99, the basis and shrink wrap processes are repeated 141. This process allows the system to continually learn and adapt to changes in the environment. Endmember data and the accompanying exemplar set and source data can be labeled as being consistent with a particular threat or target allowing the system to learn and remember the signature of specific targets in real time 34.

Again, referring to FIG. 2, the filter vectors and endmember data stream are transmitted from learning module 30, to demixer module 40, for computation of the endmember coefficients. The original data set from the sensor is also transmitted to demixer module 20 through the first processor pipe.

Demixer module 20 may contain several processors, each of which convolves the unprocessed data vector with a different filter vector. These operations could be performed sequentially on a single fast processor, but in the best mode they are performed in parallel. The output of demixer module 20, is a vector called the endmember coefficient vector, the jth element of which indicates the fraction of the jth fundamental pattern which is present in the unprocessed data vector. The endmember coefficients indicate the amplitude of the signal from the associated endmember, in a mixed spectrum.

Demixer module 20 convolves the unprocessed data vector and computes the endmember coefficient in accordance with the equation;

$$F_J \cdot d_k \sum_{j=1}^{n} c_{jk} F_J \cdot E_j + F_J \cdot N_k \approx c_{JK}$$

where $F_1$=said filter vector, $d_k$=said data set, $c_{jk}$=said endmember coefficient, $N_k$=noise vector, $E_j$=said endmember and n is the number of endmembers.

Demixer module 20 next computes the fraction coefficient 131, which tells what percentage of the photons from the given pixel are associated with the endmember in accordance to the equation:

$$c_{jk\,fraction} = \frac{c_{jk}(A(E))_j}{A(d_k)}$$

where $A(d_k)$ is the area under vector $d_k$, i.e. the sum of the elements of $d_k$.

Figure 13:
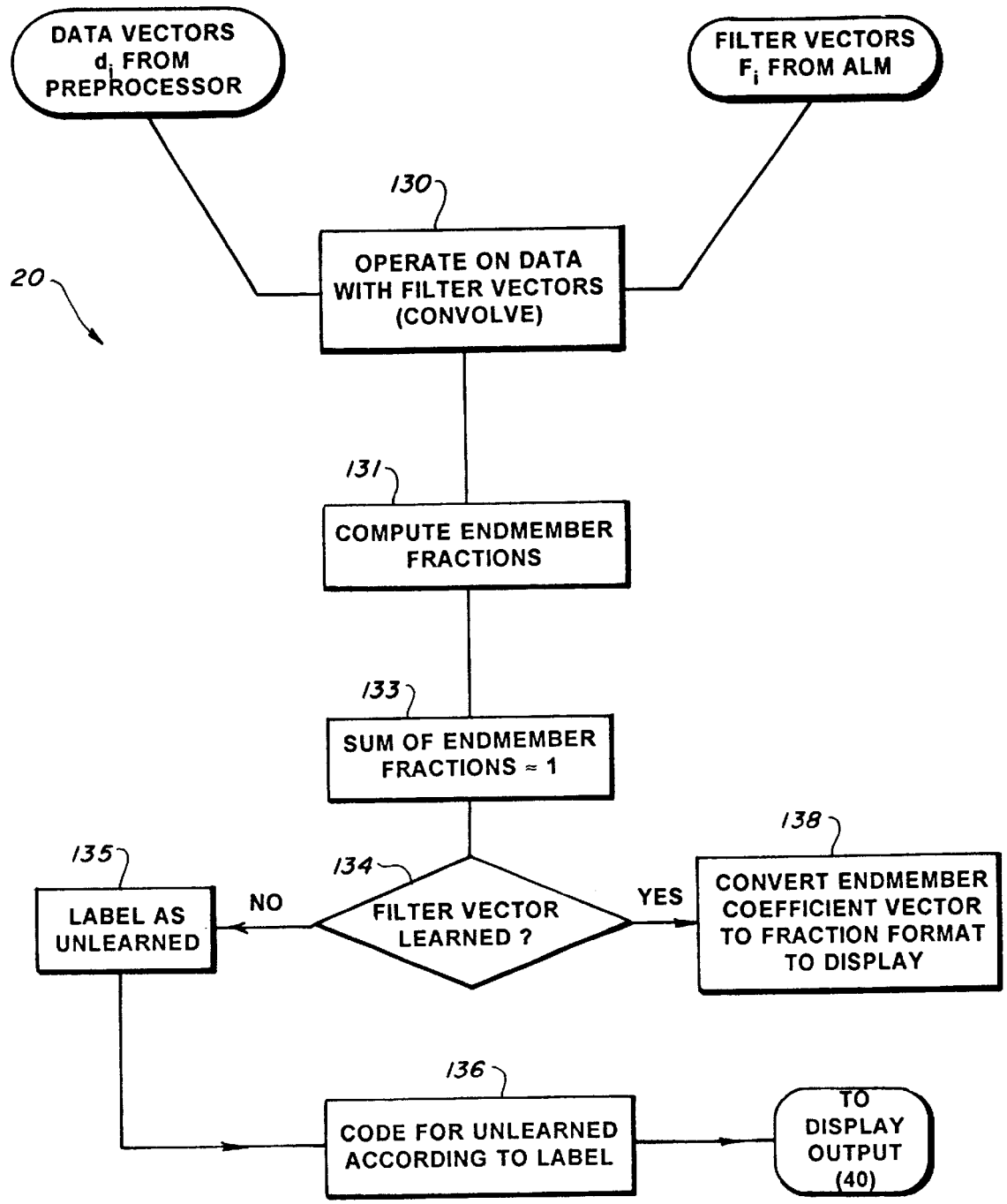
FIG. 13. is a flowchart of the operation of the demixer module.

FIG. 13 illustrates the flowchart for demixer module operation including the demixer module's 20 function in the system's learning process. If the pixel information passed from the preprocessor indicates bad data or an unlearned spectrum 133, 134 demixer module 20 routes that information to the display/output module 40 with a notation of the status of the pixel data 135, 136.

The spectral information, filter vectors, and endmember coefficients is passed to the $$d_k = \sum_{j=1}^{n} c_{jk} E_j + N_k$$

display/output module 40 for display and further processing 138. The spectral characteristics of the data is stored, transmitted or displayed in terms of endmembers and endmember coefficients maintaining the relation:

where $d_k$=said data set, $c_{jk}$=said endmember coefficient and c is $\geq 0$, $N_k$=noise and $E_j$=said endmember.

CHOMPS feature three compression modes which provide significant compression of the massive data stream coming from the sensor. These compression modes in a preferred embodiment take advantage of the priority and zone searching techniques disclosed above.

In the first and most basic compression packaging mode, the CHOMPS algorithm employs the basic IHPS algorithm, using the computational management techniques described in this text, and produces a compressed data set which expresses the scene as, a set of fraction planes belonging to each endmember E. Compression results from the low dimensional space in comparison to the number of bands employed by the sensor.

For purposes of example, assume a sensor operates in 200 bands, the data set produced by that sensor as input for IHPS will thus tend to have what approaches 200,000,000 scalar values. This assumes only 1,000,000 pixels in a scene. IHPS expresses the scene as fraction planes. The IHPS endmember form compresses the data stream by the ratio:

where $N_B$ is the number of bands and $N_E$ is the number of endmembers necessary to describe the scene.

$$\frac{N_B}{N_E}$$

For many natural scenes at a reasonably small loss rate, IHPS requires on the order of 10 endmembers to describe the scene which results in a compression ratio of 20:1 for a 200 band sensor.

Following each ALM cycle, all exemplars for the segment are either left uncompressed, are projected into the orthogonal basis space or are projected to the current shrinkwrap.

Figure 19:
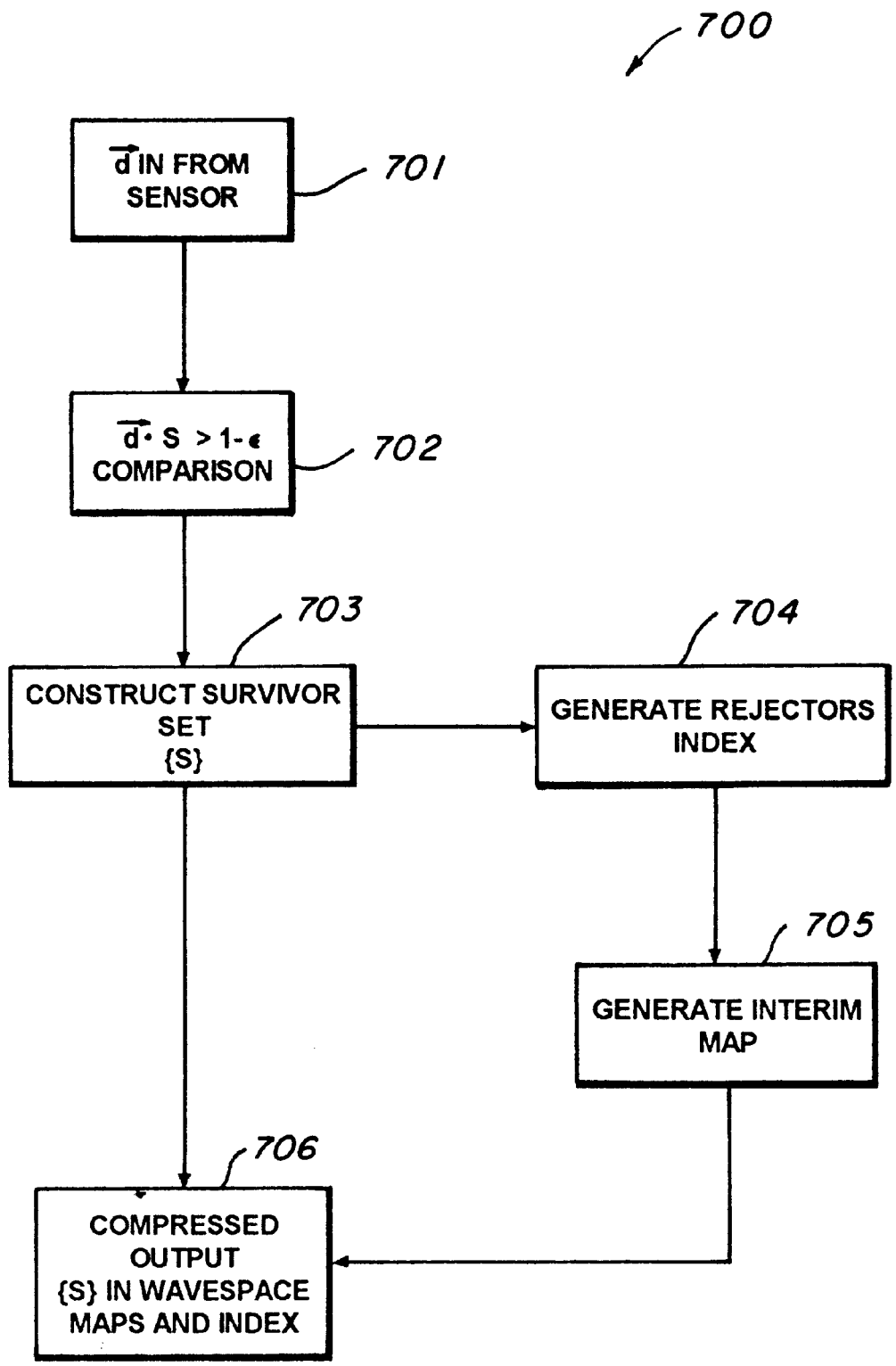
FIG. 19. is a logic flowchart of the CHOMPS wavespace compression mode.

Referring to FIG. 19 which shows a simple logical flowchart of the second compression packaging mode in which the data is expressed in terms of the exemplars and two maps used for reconstruction of the data set d. The complete data set is received from the sensor 701, containing for purposes of example approximately 200 million scalar values describing a scene. CHOMPS next uses the prescreener to perform the prescreener comparison 702, and reduces the complete data set to an exemplar set 703. The exemplar set size can be adjusted by the user on the basis or the precision desired or other mission requirements, but for purposes of example may be 10,000 vectors in size (2,000,000 scalars). The data are stored in the form of (1) the exemplar which rejected, i.e. matched, it, typically by an index associated with that exemplar, rather than the exemplar itself and (2) the magnitude of d, because the exemplars will typically be normalized. For a high dimensional space, the bits necessary to represent the total number of exemplars, and represent the magnitude of a vector, is much less than the number of bits necessary to represent the vector directly, In this manner, the system compresses thedata for convenient storage. The number of times an exemplar S rejects a data vector d may be recorded also, for example to be used in setting the amount of time an exemplar will be retained before being removed from exemplar set {S}.

Thus the data stream of 200 million scalars is expressed as approximately 10,000 exemplars each having 200 elements and the map information, each map containing 1 scalar for each of the 1 million data set vector, rather than the 200 scalar values for each data vector. This represents a data set compression of the approaching 50:1 using the wavespace mode.

Figure 20:
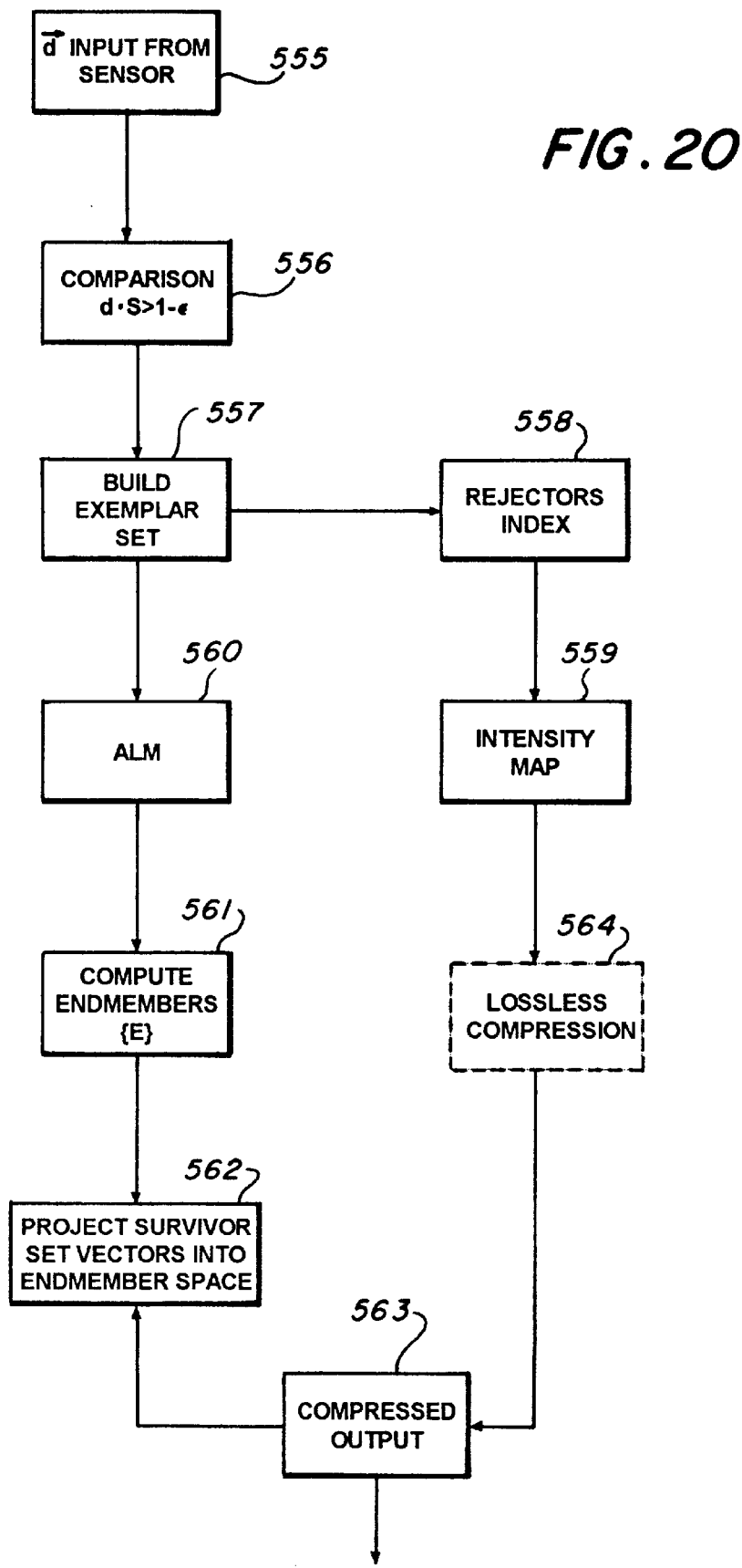
FIG. 20. is a logic flowchart of the CHOMPS endmember compression mode.

The third compression packaging mode is similar to the foregoing, except that CHOMPS projects the exemplars into endmember space for additional compression. Referring to FIG. 20 which is a flowchart of the endmember compression mode, the data set is received in the prescreener from the sensor 555 and compared to the existing exemplars 556, just as in the wavespace compression mode 700. The prescreener builds the exemplar set 557, rejector index 558, and an intensity map 559 identical to that in the wavespace compression mode 700. However, in the endmember compression mode CHOMPS sends the exemplar set to the ALM 560, for computation of endmembers 561. The exemplar set is thus projected into endmember space 562, realizing additional compression. The compressed exemplar set is expressed in endmember space, each exemplar now expressed as 10 or so scalars rather than the 200 or so scalar values necessary in wavespace, assuming a sensor having 200 bands. The endmembers expressed in wavespace are added to facilitate reconstruction of the scene. The rejector index and intensity map are also output for reconstruction of the data set. Endmember compression realizes a 100:1 reduction in the data transfer necessary to describe a scene. The output packet of the compressed segment data consists of the exemplar list in any of the projections above, the endmembers or basis vectors and the two decoding maps. Additional information can be injected, such as. the number of vectors replaced by each exemplar.

CHOMPS thus uses the Adaptive Learning Module Pipeline to construct a compressed data set, along with the necessary scene mapping data, facilitating the efficient storage, download and the later reconstruction of the complete data set with minimal deterioration of signal information.

In a preferred embodiment the CHOMPS employs the following algorithm:

a) Receive data vector $d_i$ into the prescreener.

b) Designate priority exemplars from the existing exemplar set and perform priority testing according to the relation ($d_i \circ S_j = 1 > \epsilon$) of the data vector $d_i$ using the exemplars $S_j$ designated with the higher priority.

c) If priority testing generates a match condition go to (a), if no match condition produced after N iterations, continue.

d) Select at least one reference point or reference vector.

e) Designate at least one match zone and perform zone testing on data vector $d_i$ according to the relation ($d \circ S = 1 > \epsilon$) using only those exemplars $S_j$ which are contained (to the desired precision) within the match zone.

f) If zone testing generates a match condition go the step (a), if no match condition is produced add $d_i$ to the exemplar set and go get next data vector $d_{i+1}$ exemplars are exhausted.

g) Perform compression packaging via full IHPS mode, wavespace mode, exemplar mode or a combination thereof Obviously, many modifications and variations of the present invention are possible in light of the above teachings. For example this invention may be practiced without the use of a parallel processing architecture, different combinations of zone and priority testing may be employed, ie., zone testing may be employed without priority testing or standard compression algorithms may be employed to compress the intensity map and rejectors index.

It is therefore understood that, within the scope of the appended claims, the invention may be practiced otherwise than as specifically described.

What is claimed is:

1. A system comprising:

sensor means for generating a plurality of data vectors;

means for producing endmember vectors responsive to said means for generating;

wherein said means for producing comprises a module adapted to reduce the spanning space of said data vectors by application of the Gram-Schmidt algorithm using salients;

means for compression said plurality of data vectors by employing the CHOMPS algorithm.

2. A system for filtering data vectors, other than a hashing-based system, comprising:

means for generating said data vectors;

means for generating a set of exemplar vectors;

means for comparing said data vectors to said exemplar vectors;

wherein said means for comparing comprises means for constructing a preselected search structure in which to effect comparison of said data vectors to selected ones of said exemplar vectors effective to determine whether each of said data vectors matches at least one of said selected ones of said exemplar vectors under a preselected matching criterion.

3. The system of claim 2, wherein said search structure is an ordering of said exemplar vectors in a pop-up stack, each of said exemplar vectors positioned in said stack according to how recently said each of said exemplar vectors has matched a data vector under said preselected matching criterion.

4. A system for filtering data vectors, comprising:
means for generating said data vectors;
means for generating a set of exemplar vectors;
means for comparing said data vectors to said exemplar vectors;
wherein said means for comparing comprises means for constructing a preselected search structure in which to effect comparison of said data vectors to selected ones of said exemplar vectors effective to determine whether each of said data vectors matches at least one of said selected ones of said exemplar vectors under a preselected matching criterion;
wherein said search structure is a zone search structure, said zone search structure comprising:
a plurality of zones disposed angularly about a preselected reference vector, and wherein said means for comparing further comprises:
  a. means for determining the angle each of said exemplar vectors makes with said reference vector effective to determine which of said zones contains said each of said exemplar vectors;
  b. means for determining the angle each of said data vectors makes with said reference vector effective to determine which of said zones contains said each of said data vectors; and
  c. second means for comparing, under said preselected matching criterion, said each of said data vectors to those of said exemplar vectors contained in the one of said zones containing said each of said data vectors.

5. The system of claim 4, wherein said second means for comparing, under said preselected matching criterion, includes means for performing a zig-zag search which, for said each of said data vectors, begins with the one of said exemplar vectors nearest the angular middle of said one of said zones containing said each of said data vectors, and proceeds sequentially to those of said exemplar vectors increasingly further from said middle of said one of said angular zones.

6. The system of claim 4, wherein said reference vector is at least two reference vectors, and said plurality of angular zones is a corresponding at least two pluralities of angular zones, each of said pluralities disposed about a corresponding one of said at least two reference vectors; and wherein said means for comparing comprises:
means for determining the angle said each of said exemplar vectors makes with each of said at least two reference vectors effective to determine the respective at least two angular zones about each of said at least two reference vectors containing said each of said exemplar vectors;
means for determining the respective at least two angular zones about said each of said at least two reference vectors containing said each of said data vectors;
means for determining the intersection of said at least two angular zones; and
second means for comparing, under said preselected matching criterion, said each of said data vectors to those of said exemplar vectors disposed in said intersection of said at least two angular zones.

7. The system of claim 2, wherein said means for comparing data vectors comprises;
means for receiving a sequence of data vectors;
means for applying a similarity criterion between data vectors in said sequence; and
responsive to the result of said means for applying of said similarity criterion, means for discarding said exemplar vectors and causing said means for generating to generate new exemplar vectors.

8. A method of filtering data vectors, other than a hashing-based method, comprising:
generating said data vectors;
generating a set of exemplar vectors;
comparing said data vectors to said exemplar vectors;
wherein said comparing comprises constructing a preselected search structure in which to effect comparison of said data vectors to selected ones of said exemplar vectors effective to determine whether each of said data vectors matches at least one of said selected ones of said exemplar vectors under a preselected matching criterion.

9. The method of claim 8, wherein said search structure is an ordering of said exemplar vectors in a pop-up stack, each of said exemplar vectors positioned in said stack according to how recently said each of said exemplar vectors has matched a data vector under said preselected matching criterion.

10. A method of filtering data vectors, comprising;
generating said data vectors;
generating a set of exemplar vectors;
comparing said data vectors to said exemplar vectors;
wherein said comparing comprises constructing a preselected search structure in which to effect comparison of said data vectors to selected ones of said exemplar vectors effective to determine whether each of said data vectors matches at least one of said selected ones of said exemplar vectors under a preselected matching criterion;
wherein said search structure is a zone search structure, said zone search structure comprising:
a plurality of zones disposed angularly about a preselected reference vector, and wherein said comparing further comprises:
  a. determining the angle each of said exemplar vectors makes with said reference vector effective to determine which of said zones contains said each of said exemplar vectors;
  b. determining the angle each of said data vectors makes with said reference vector effective to determine which of said zones contains said each of said data vectors; and
  c. comparing, under said preselected matching criterion, said each of said data vectors to those of said exemplar vectors contained in the one of said zones containing said each of said data vectors.

11. The method of claim 10, wherein said comparing, under said preselected matching criterion, is a zig-zag search which, for said each of said data vectors, begins with the one of said exemplar vectors nearest the angular middle of said one of said zones containing said each of said data vectors, and proceeds sequentially to those of said exemplar vectors increasingly further from said middle of said one of said angular zones.

12. The method of claim 10, wherein said reference vector is at least two reference vectors, and said plurality of angular zones is a corresponding at least two pluralities of angular zones, each of said pluralities disposed about a corresponding one of said at least two reference vectors; and
wherein said comparing comprises:
determining the angle said each of said exemplar vectors makes with each of said at least two reference vectors effective to determine the respective at least two angular zones about each of said at least two reference vectors containing said each of said exemplar vectors;

determining the respective at least two angular zones about said each of said at least two reference vectors containing said each of said data vectors;

determining the intersection of said at least two angular zones; and comparing, under said preselected matching criterion, said each of said data vectors to those of said exemplar vectors disposed in said intersection of said at least two angular zones.

13. The method of claim 8, wherein said comparing data vectors comprises;

receiving a sequence of data vectors;

applying a similarity criterion between data vectors in said sequence; and responsive to the result of said applying of said similarity criterion, discarding said exemplar vectors and causing said means for generating to generate new exemplar vectors.

* * * * *